(12) United States Patent
Lee

(10) Patent No.: US 10,082,882 B2
(45) Date of Patent: Sep. 25, 2018

(54) DATA INPUT APPARATUS AND METHOD THEREFOR

(71) Applicant: Ju Hyup Lee, Suwon-si (KR)

(72) Inventor: Ju Hyup Lee, Suwon-si (KR)

( * ) Notice: Subject to any disclaimer, the term of this patent is extended or adjusted under 35 U.S.C. 154(b) by 0 days.

(21) Appl. No.: 14/652,277

(22) PCT Filed: Jan. 8, 2013

(86) PCT No.: PCT/KR2013/000114
§ 371 (c)(1),
(2) Date: Jun. 15, 2015

(87) PCT Pub. No.: WO2014/109415
PCT Pub. Date: Jul. 17, 2014

(65) Prior Publication Data
US 2015/0324009 A1 Nov. 12, 2015

(51) Int. Cl.
*G06F 3/023* (2006.01)
*G06F 3/02* (2006.01)
*G06F 3/041* (2006.01)

(52) U.S. Cl.
CPC ............... *G06F 3/023* (2013.01); *G06F 3/02* (2013.01); *G06F 3/0202* (2013.01); *G06F 3/041* (2013.01)

(58) Field of Classification Search
CPC . G06F 3/023; G06F 3/041; G06F 3/02; G06F 3/0202
See application file for complete search history.

(56) References Cited

U.S. PATENT DOCUMENTS

| 6,243,080 B1* | 6/2001 | Molne | G06F 3/03547 345/157 |
| 2008/0158162 A1* | 7/2008 | Ahn | G06F 3/0233 345/168 |
| 2010/0134428 A1* | 6/2010 | Oh | G06F 3/0234 345/173 |

(Continued)

FOREIGN PATENT DOCUMENTS

| KR | 20-0304005 Y1 | 2/2003 |
| KR | 10-2009-0067045 A | 6/2009 |
| KR | 10-0959713 B1 | 5/2010 |

(Continued)

OTHER PUBLICATIONS

Search Report for International Application No. PCT/KR2013//000114.

*Primary Examiner* — Christopher E Leiby
(74) *Attorney, Agent, or Firm* — LRK Patent Law Firm

(57) ABSTRACT

The present invention relates to a data input apparatus and a method thereof. The data input apparatus can input data independently or sequentially via a first input or a second input for selecting one of the indication positions or a pair of indication positions of an input unit provided with a plurality of front and back indication positions based on a reference line passing through a reference point, which is a reference position for a base within a finger movement range. When a finger is placed on the input unit, the indication positions of the input unit are easily recognized as front and back corresponding input selection positions based on the reference line or the center of the input unit. Therefore, a user can easily and rapidly input data upon inputting data using the input unit.

15 Claims, 29 Drawing Sheets

(56) References Cited

U.S. PATENT DOCUMENTS

2010/0302016 A1* 12/2010 Zaborowski ............ G06F 3/018
340/407.2

FOREIGN PATENT DOCUMENTS

| KR | 10-2010-0095999 A | 9/2010 |
|----|-------------------|--------|
| WO | 2009-145464 A2 | 12/2009 |
| WO | 2010-030134 A2 | 3/2010 |

* cited by examiner (a)

(b)

(c)

DATA INPUT APPARATUS AND METHOD THEREFOR

TECHNICAL FIELD

The present invention relates to a data input apparatus and method and, more particularly, to a data input apparatus and method in which data input is performed in response to a first or second input for selecting a single indication location or a pair of indication locations from a plurality of indication, locations of an input unit within the input unit including the plurality of indication locations in front-back forms.

BACKGROUND ART

In general, keyboards are widely used as devices for inputting information to computers, electronic devices, or various terminals.

Keyboards are universally used because they can perform various functions via user-friendly manipulation. However, it is not easy to reduce the sizes of keyboards so that they can be held by one hand.

Recently, in keeping with the rapid development of hardware and software in areas such as semiconductor technology, information processing technology and communication technology, electronic devices or handheld terminals are further reduced in size and have developed into handheld computers. Furthermore, with the rapid development of graphic user interface (GUI) technology, data input environments are becoming increasingly varied and complex.

In this situation, the importance of data input within various electronic devices or handheld terminals has further increased. Furthermore, users' desire to input a larger amount of data via simpler and more intuitive manipulation has also gradually increased.

That is, there is a need for an input device, into which an input unit of appropriate size via which input is performed within a finger movement range more rapidly and easily, conventional qwerty arrangement-type input selection locations which are friendly to users, and a more natural input method of applying various functions and user-friendly manipulation environment of the keyboard to the users of small-sized electronic devices or various handheld terminals without a change have been incorporated.

As a related technology, an English Alphabet input system using 6 key buttons (Korean Registered Utility Model No. 20-0304005 registered on Jan. 29, 2003) has been disclosed.

DISCLOSURE

Technical Problem

An object of the present invention is to provide a data input apparatus and method that are capable of easily and rapidly inputting data to computers, electronic devices, various terminals and mobile devices using a single finger, for example, the thumb.

Technical Solution

As a means for solving the object of the present invention, in accordance with a first aspect of the present invention, a data input apparatus, including: at least one input unit which is provided in a base for inputting data, and which generates an input signal in response to a selection of an input; a detection unit which detects the input; and a control unit which distinguishes and determines a corresponding input from the input signal detected and generated from the input, which extracts data allocated to the determined input signal from a memory unit in which allocated input signals have been stored, and which performs input of the data; wherein the input unit includes a first input unit having a specific width and length within a finger movement range, a second input unit spaced apart from the first input unit and placed in front of the first input unit, and a third input unit spaced apart from the first input unit and placed behind the first input unit; wherein the first input unit includes three first front indication locations spaced apart from a single reference line at specific intervals and disposed on a front side and three first back indication locations spaced apart from the reference line at specific intervals and disposed on a back side, based on the reference line that passes through a reference point placed at a central portion; wherein the second input unit includes three second indication locations disposed at locations corresponding to the three first front indication locations; wherein the third input unit includes three third indication locations disposed at locations corresponding to the three first back indication locations; wherein the front indication locations and back indication locations of the first input unit are placed within a rolling motion range of a fingerprint region of a tip of a thumb, and the front indication locations and the back indication locations are recognized in left-middle-right forms based on the center of the fingerprint region; and wherein, in the input unit, the first input unit is recognized as a single central portion, the indication locations of the second input unit are recognized in a front left-front middle-front right form relative to the first input unit based on the first input unit, the indication locations of the third input unit are recognized in a back left-back middle-back right form relative to the first input unit based on the first input unit, an input based on an independent selection or sequential selection of at least one of the indication locations of the first input unit to the third input unit is detected, and an input signal corresponding to the input is generated.

Furthermore, in accordance with a second aspect of the present invention, there is proposed a data input method, including: detecting, by a data input apparatus including an input unit, an input according to an independent or sequential selection for at least one of the indication locations of a first input unit to a third input unit, wherein the input unit includes the first input unit having a specific width and length within a finger movement range, the second input unit spaced apart from the first input unit and placed on the front side based on the first input unit, and the third input unit spaced apart from the first input unit and placed on the back side based on the first input unit, the first input unit includes three first front indication locations disposed at locations spaced apart from a single reference line passing through a reference point placed at a central portion at specific intervals on the front side and three first back indication locations disposed at locations spaced apart from the reference line at specific intervals on the back side based on the reference line, the second input unit includes three second indication locations disposed at locations corresponding to the three first front indication locations, and the third input unit includes three third indication locations disposed at locations corresponding to the three first back indication locations; reading, by the data input apparatus, data or a data set corresponding to the detected input from a memory unit; and generating, by the data input apparatus, an input signal based on the read data or data set.

Advantageous Effects

According to the present invention, data can be easily and rapidly input to computers, electronic devices, various terminals and mobile devices using a single finger, for example, the thumb.

<Description of reference numerals>

Figure 1:
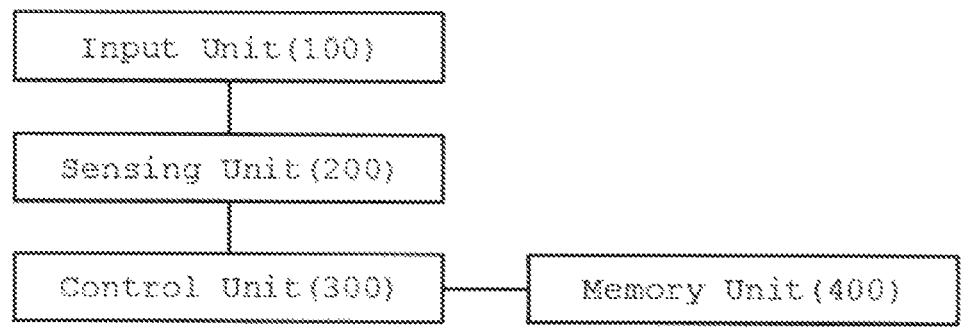
FIG. 1 is a configuration block diagram of a data input apparatus according to the present invention.

| | |
|---|---|
| 1: data input apparatus | 10: base |
| 100 (100', 100''): input unit | 102: reference point |
| 104: reference line | 111: first input unit |
| 112: second input unit | 113: third input unit |
| 116: input central portion | 120: indication location |
| 121: first front indication location | 122: first back indication location |
| 125: second indication location | 127: third indication location |
| 129: selection unit | 130: input face |
| 160: segmentation groove | 162: segmentation line |
| 164: protrusion | 166: protrusion frame |
| 168: support | 170: concave portion |
| 172: asymmetrical concave portion | 180: elastic member |
| 200: detection unit | 260: touch detection unit |
| 300: control unit | 400: memory unit |
| 500: display unit | 510 (510'): data arrangement unit |
| 520: menu window | 600: fingerprint |
| 611: third rolling motion (left-middle-right) | |
| 612: second rolling motion (front-back) | |
| 613: third rolling motion (diagonal) | |
| 630: left | 631: left front |
| 632: left back | 640: middle |
| 641: middle front | 642: middle back |
| 650: right | 651: right front |
| 652: right back | 660: front side |
| 661: front left | 662: front middle |
| 663: front right | 670: back side |
| 671: back-side left | 672: back-side middle |
| 673: back-side right | 680: left side |
| 681: first left front | 682: first left back |
| 683: second left front | 684: third left back |
| 690: right side | 691: first right front |
| 692: first right back | 693: second right front |
| 694: third right back | 710: finger |
| 760 (760'): function key | 912: cradle |
| S: center of first input unit 111 or input central portion 116 | |
| SS: center of fingerprint region | |

BEST MODE

As the best mode for implementing the invention, the present invention includes at least one input unit 100 which is provided in a base 10 for receiving data and generates an input signal in response to the selection of an input; a detection unit 200 which detects the input; and a control unit 300 which distinguishes and determines a corresponding input from the input signal detected and generated from the input, extracts data, allocated to the determined input signal, from a memory unit 400 in which allocated input signals have been stored, and performs the input of the extracted data.

In this case, the input unit includes a first input unit 111 which has a specific width and length in a finger movement range, a second input unit 112 which is spaced apart from the first input unit and placed in front of the first input unit (in the direction of the arrow F in the drawing), and a third input unit 113 which is spaced apart from the first input unit and placed behind the first input unit (in the direction of the arrow B in the drawing).

Furthermore, the first input unit includes three first front indication locations 121 spaced apart from one another at specific intervals and disposed on a front side (in the direction of the arrow F in the drawing) and three first back indication locations 122 spaced apart from one another at specific intervals and placed on a back side (in the direction of the arrow B in the drawing), based on a single reference line 104 that passes through a reference point 102 placed at a central portion.

Furthermore, the second input unit includes three second indication locations 125 disposed at locations corresponding to the three first front indication locations. The third input unit includes three third indication locations 127 disposed at locations corresponding to the three first back indication locations.

In this case, the front indication locations 121 and back indication locations 122 of the first input unit are placed within the rolling motion range of the fingerprint region of the tip of the thumb, and thus the front indication locations and back indication locations are recognized in left-middle-right forms based on the center of the fingerprint region 600 of the finger. Meanwhile, the indication locations 120 of the second input unit are recognized in the front left-front middle-front right form of the third input unit based on the first input unit, and the indication locations 120 are recognized in the back left-back middle-back right form relative to the first input unit.

Accordingly, there is provided a data input apparatus in which an input according to an independent selection or sequential selection of at least one of the indication locations 120 of the first input unit to the third input unit is detected and an input signal corresponding to the input is generated.

MODE FOR INVENTION

Hereinafter, the present invention is described in detail with reference to the accompanying drawings.

Figure 2:
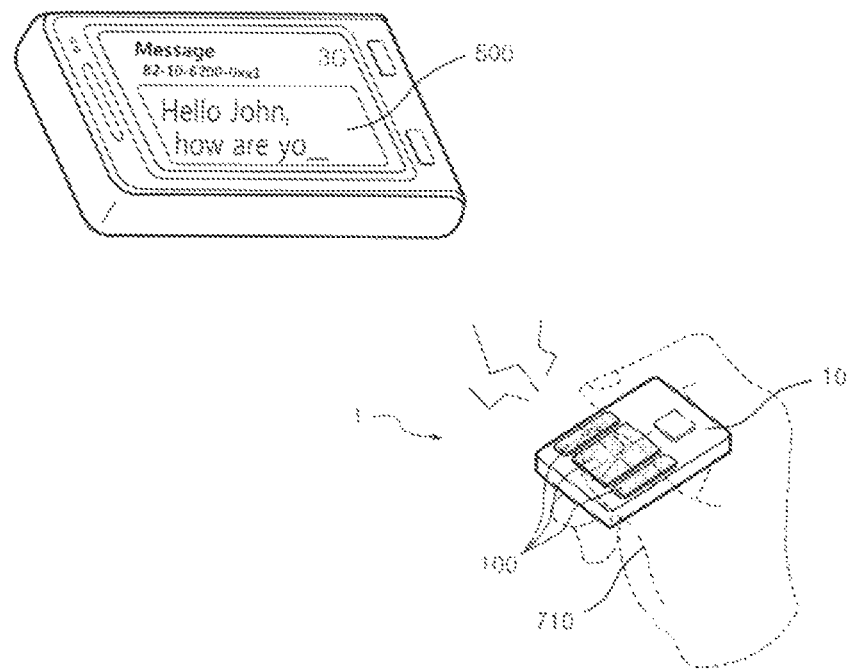
FIG. 2 is a perspective view of a terminal in which the data input apparatus according to the present invention has been configured.

Referring to FIGS. 1 and 2, the data input apparatus 1 according to the present invention includes the at least one input unit 100 which generates an input signal in response to the selection of an input at a specific location of the base 10; the detection unit 200 which detects the input; and the control unit 300 which distinguishes and determines a corresponding input from the input signal detected and generated from the input, extracts data, allocated to the determined input signal, from the memory unit 400, and performs the input of the extracted data.

Figure 3:
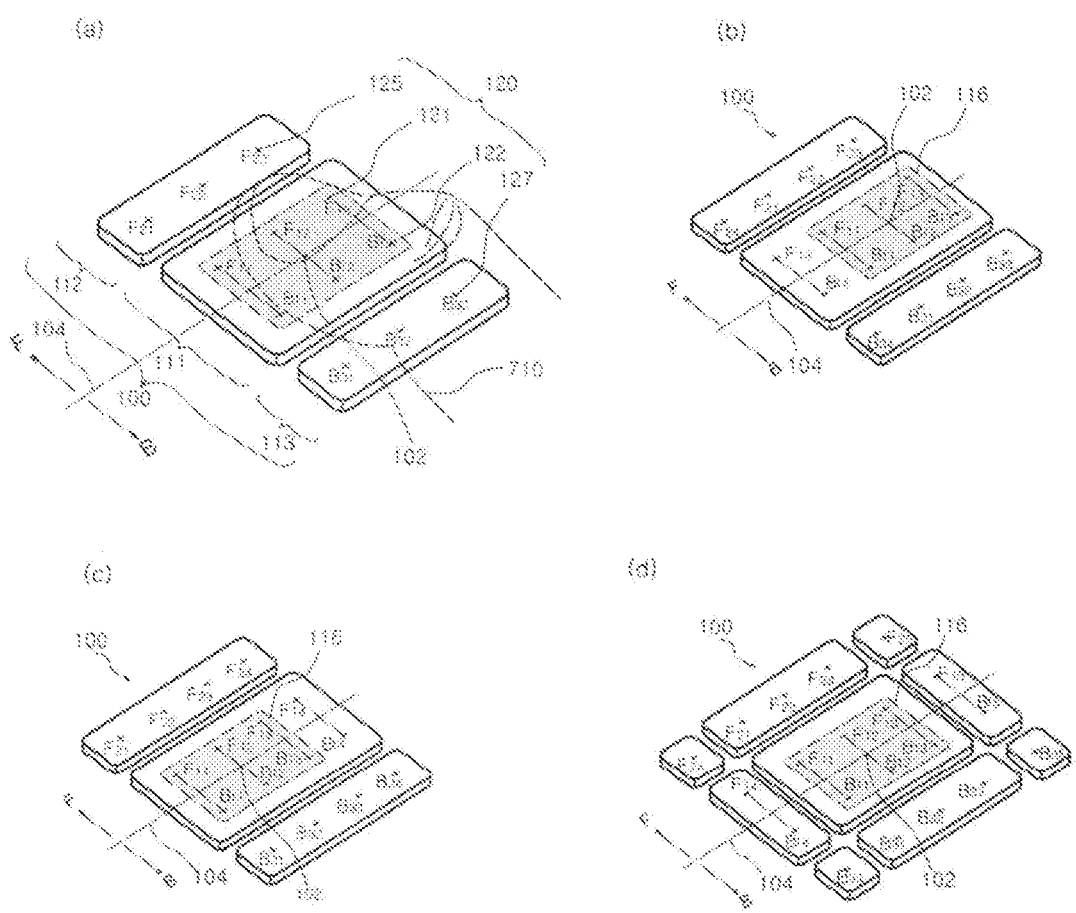
FIG. 3 is a perspective view illustrating the concept of the input unit of the data input apparatus according to the present invention and the configuration of the input unit according to the present invention.

More specifically, as shown in FIG. 3, the input unit 100 according to the present invention includes the first input unit 111 which has a specific width and length in a finger movement range, the second input unit 112 which is spaced apart from the first input unit and placed in front of the first input unit (in the direction of the arrow F in the drawing), and the third input unit 113 which is spaced apart from the first input unit and placed behind the first input unit (in the direction of the arrow B in the drawing). Furthermore, the first input unit includes the three first front indication locations 121 spaced apart from one another at specific intervals and disposed on the front side (in the direction of the arrow F in the drawing), and the three first back indication locations 122 spaced apart from one another at specific intervals and placed on the back side (in the direction of the arrow B in the drawing), based on the single reference line 104 that passes through the reference point 102 placed at a central portion. Furthermore, the second input unit includes the three second indication locations 125 disposed at locations corresponding to the three first front indication locations. The third input unit includes the three third indication locations 127 disposed at locations corresponding to the three first back indication locations. In this case, referring to (a) and (b) of FIG. 5, the front indication locations 121 and back indication locations 122 of the first input unit are placed within the rolling motion range of the fingerprint region 600 of the tip of the thumb, and thus the front indication locations and the back indication locations are recognized in left-middle-right forms based on the center (SS in (b) of FIG. 5) of the fingerprint region 600 of the finger. Furthermore, in the input unit, the first input unit is recognized as a single central portion. Accordingly, referring to FIG. 4, in the input unit, the indication locations 120 of the second input unit 112 are recognized in a front left-front middle-front right form relative to the first input unit 111 based on the first input unit, and the indication locations 120 of the third input unit 113 are recognized in a back left-back middle-back right form relative to the first input unit 111 based on the first input unit. Accordingly, an input based on an independent selection or sequential selection of at least one of the indication locations 120 of the first input unit 111 to the third input unit 113 may be detected in the input unit, an input signal corresponding to the input may be generated, and the corresponding input may be performed independently or sequentially.

Inputs to the input unit 100 according to the present invention include a first input in which one or more of the indication locations 120 of the first input unit 111 are selected in the input unit, and a second input in which one or more of the indication locations 120 of the first input unit 111 to the third input unit 113 are selected in the input unit. The first input and the second input are described in detail in the following embodiments.

Figure 4:
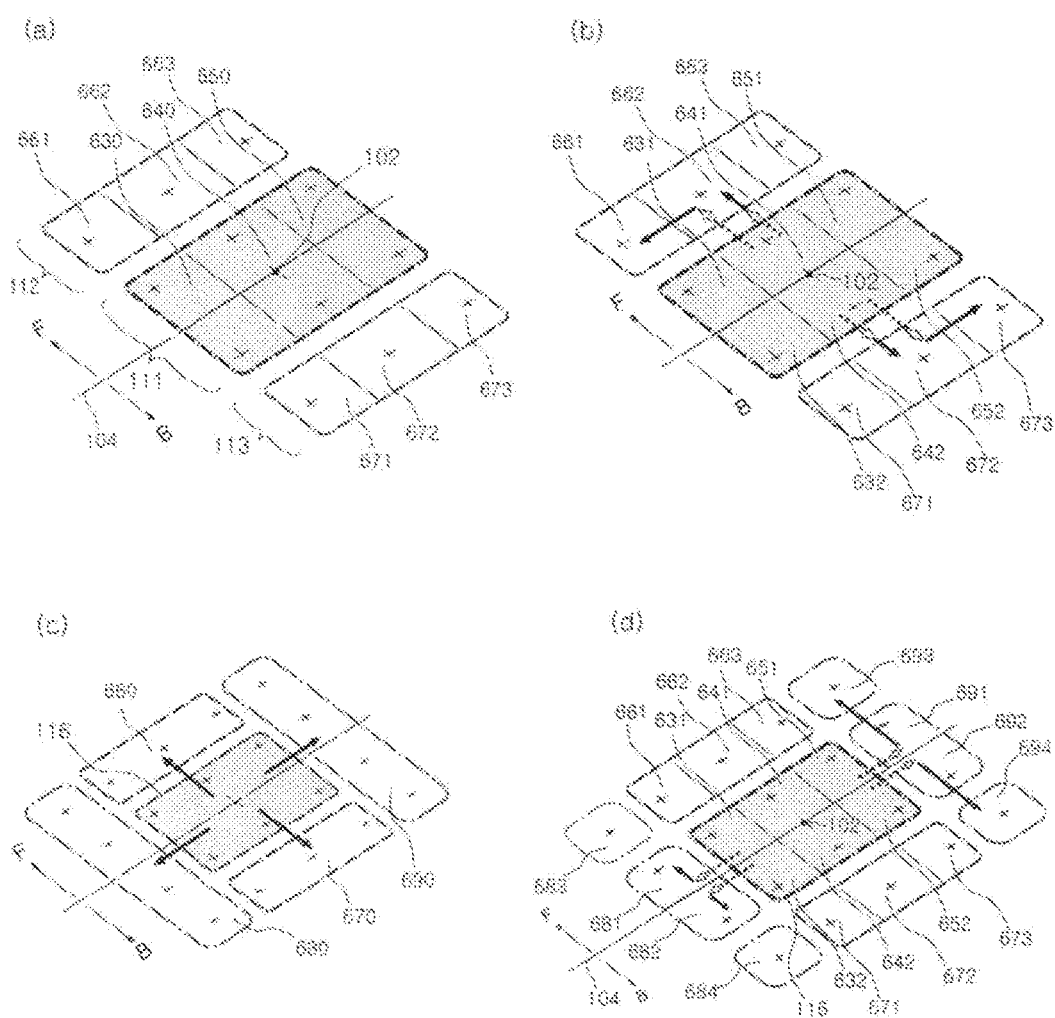
FIG. 4 is a conceptual diagram of location recognition illustrating that the indication locations of the input unit according to the present invention are recognized in front-back forms around the center of the fingerprint region.
Figure 5:
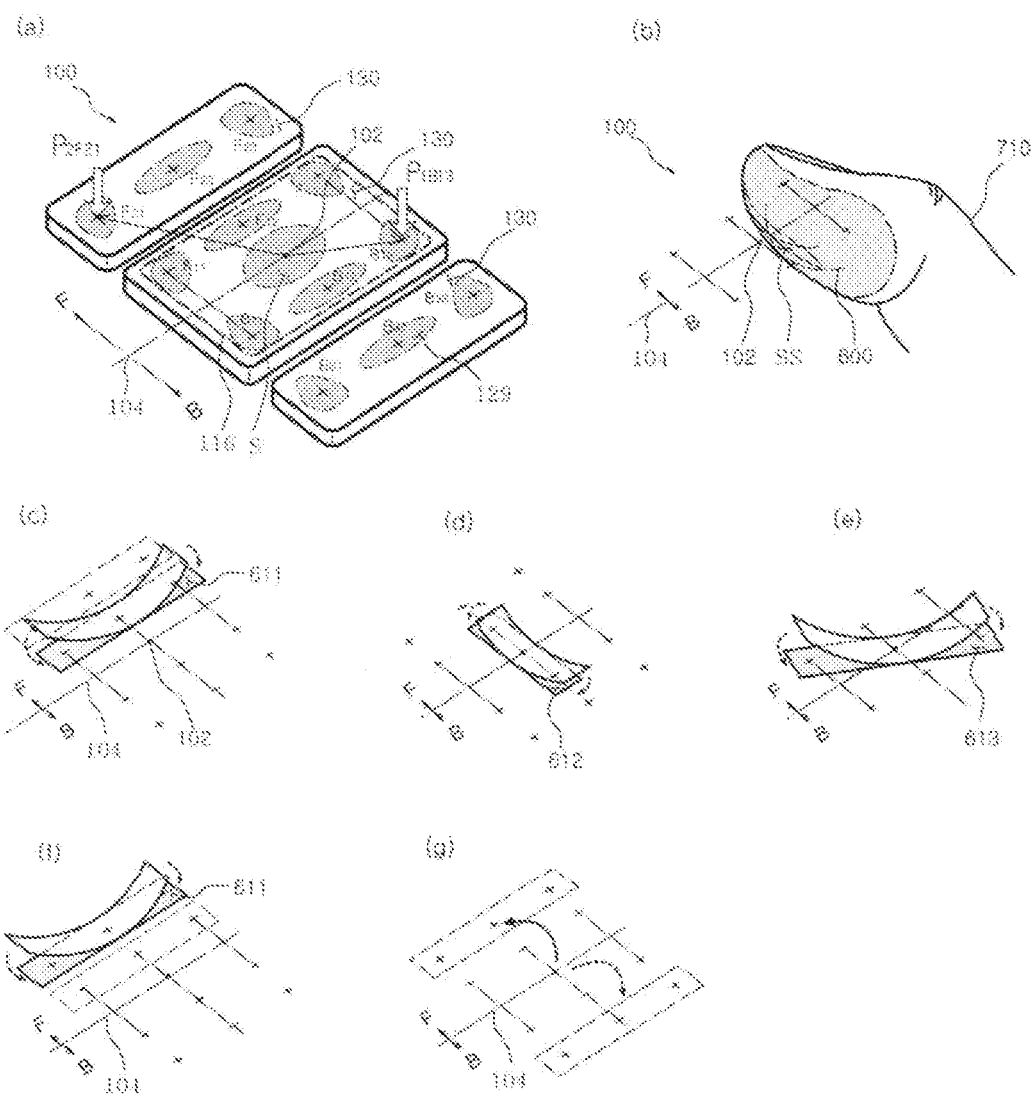
FIG. 5 is a perspective view illustrating the selection unit of the input unit according to the present invention and is an exemplary diagram illustrating the rolling motion of a finger fingerprint performed in the input unit.

Referring to FIGS. 3 to 5, in the input unit 100 according to the present invention, the front indication locations 121 and back indication locations 122 of the first input unit 111 are placed within the rolling motion range of the fingerprint region of the tip of the thumb. Accordingly, as shown in (a) of FIG. 4, the front indication locations 121 and back indication locations 122 of the first input unit are recognized in left-middle-right (630-640-650) forms based on the center (SS in (b) of FIG. 5) of the fingerprint region 600 of the finger. Furthermore, as shown in (a) and (b) of FIG. 4, left-middle-right (630-640-650) forms relative to the first input unit are recognized as the indication locations (front 121-back 122) in front-back forms based on the reference line 104. That is, in the input unit, the left-middle-right (630-640-650) forms relative to the first input unit are recognized as left front-left back (631-632), middle front-middle back (641-642), and right front-right back (651-652) forms based on the reference line 104.

Furthermore, referring to FIGS. 3 and 4, in the first input unit 111 to third input unit 113 of the input unit 100 according to the present invention, the first input unit is recognized as a single central portion. Accordingly, referring to the arrows shown in (a) of FIG. 3 and FIG. 4 ((b) and (c) of FIG. 4), in the input unit, the second indication locations 125 of the second input unit 112 are recognized as locations on the front side 660 of the first input unit and the third indication locations 127 of the third input unit 113 are recognized as locations on the back side 670 of the first input unit based on the first input unit 111. Furthermore, referring to the arrows shown in (b) of FIG. 4, in the input unit, the three second indication locations 125 of the second input unit 112 are placed within the rolling motion range of the fingerprint region of the tip of the thumb that has moved from the first input unit 111 to the front side, and the three third indication locations 127 of the third input unit 113 are placed within the rolling motion range of the fingerprint region of the tip of the thumb that has moved from the first input unit 111 to the back side. Accordingly, referring to (a) and (b) of FIG. 4, in the input unit, the indication locations 120 of the second input unit 112 are recognized in front left-front middle-front right (661-662-663) forms relative to the first input unit based on the first input unit 111. Furthermore, referring to (a) and (b) of FIG. 4, in the input unit, the indication locations 120 of the third input unit 113 are recognized in back left-back middle-back right (671-672-673) forms relative to the first input unit based on the first input unit 111. Furthermore, referring to (a) of FIG. 3 and (a) and (b) of FIG. 4, in the input unit, when a finger is placed from the first input unit 111 to the second input unit 112, the second indication locations 661, 662 and 663 of the second input unit and the first front indication locations 631, 641 and 651 of the first input unit may be recognized as the respective indication locations (front 125, and back 121) in front-back forms. Furthermore, referring to (a) of FIG. 3 and (a) and (b) of FIG. 4, in the input unit, when a finger is placed from the first input unit 111 to the third input unit 113, the first back indication locations 632, 642 and 652 of the first input unit and the third indication locations 671, 672 and 673 of the third input unit may be recognized as respective indication locations (front 122, and back 127) in front-back forms. Furthermore, referring to (a) of FIG. 3 and (a) of FIG. 4, in the input unit, when a finger is placed on the second input unit 112 and the third input unit 113 based on the first input unit 111, i.e., a single central portion, the indication locations 120 of the second input unit and the third input unit may be recognized as indication locations (front 125, and back 127) in front-back forms relative to the first input unit based on the first input unit. As described above, a user may easily and rapidly perform one or more of the first input and the second input independently or sequentially in the input unit via the location recognition of the indication locations 120 of the input unit 100 according to the present invention.

The location recognition of the indication locations 120 of the input unit 100 according to the present invention may be applied as the location recognition of corresponding indication locations in the description of the location recognitions, given with reference to FIGS. 3 and 4, in the input units of the following embodiments.

As shown in (a) of FIG. 5, a selection unit 129 for selecting each indication location 120 of the input unit may be formed at a location corresponding to a corresponding indication location on top of the input unit 100 according to the present invention.

Figure 6:
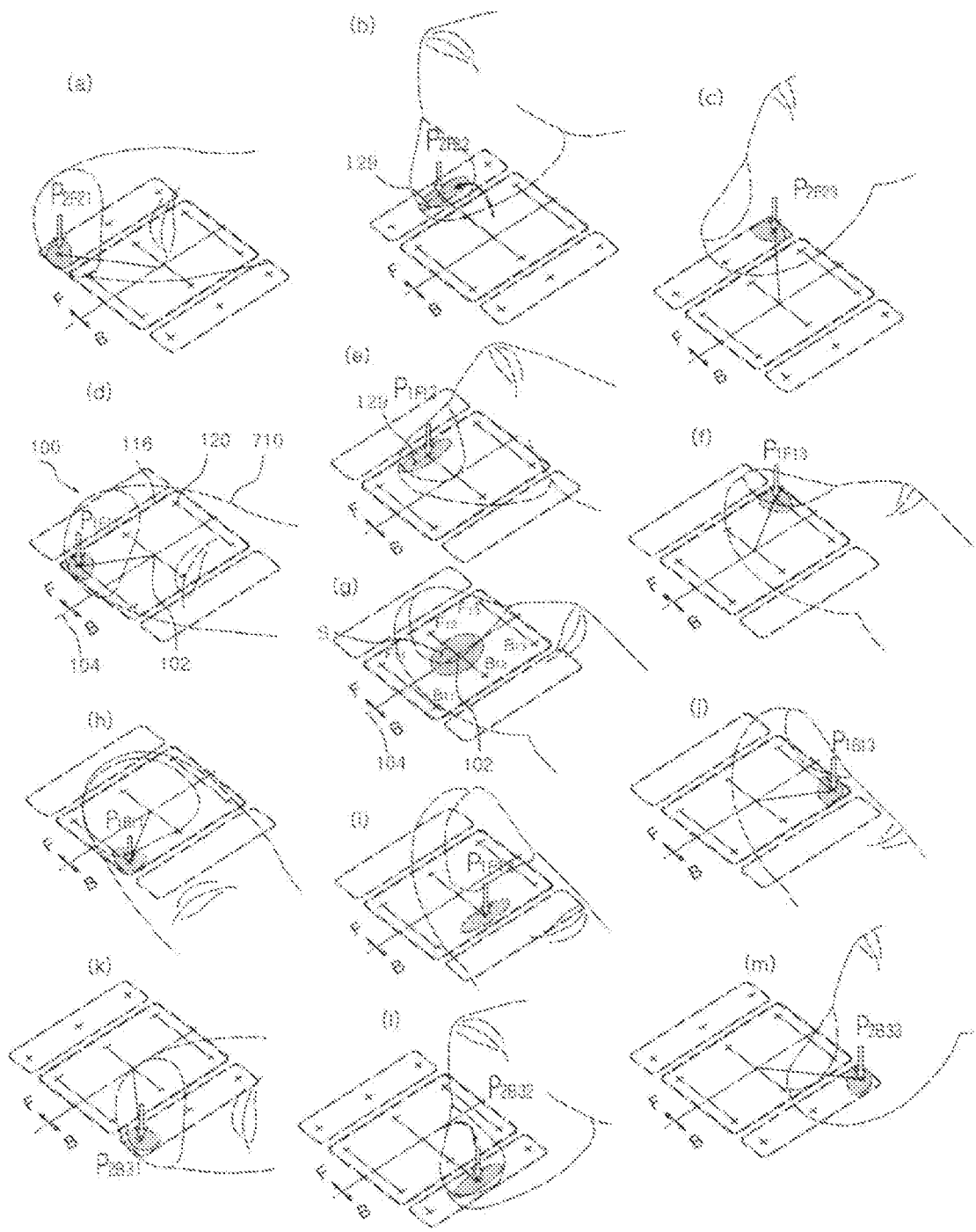
FIG. 6 is an exemplary diagram illustrating the input operation of the finger rolling motion performed in the input unit according to the present invention.

Referring to (c) to (g) of FIGS. 5 and 6, the indication locations 120 of the input unit 100 according to the present invention may be selected by various types of input operations, including a first rolling motion 611, a second rolling motion 612, and a third rolling motion 613.

In the input operation, as shown in (c) and (f) of FIG. 5, the first rolling motion 611 is the rolling motion of a finger for moving the finger in the left-middle-right (611) form based on the center (SS in (b) of FIG. 5) of the fingerprint region 600 of the finger with respect to the indication locations 120 of the input unit 100 and selecting a corresponding indication location. Furthermore, as shown in (d) of FIG. 5, the second rolling motion 612 is a rolling motion of a finger for moving the finger in the front-back (612) form based on the center of the fingerprint region 600 of the finger with respect to the indication locations 120 of the input unit 100 and selecting a corresponding indication location. Furthermore, as shown in (e) of FIG. 5, the third rolling motion 613 is the rolling motion of the finger for moving the finger in the diagonal (613) form based on the center of the fingerprint region 600 of the finger with respect to the indication locations 120 of the input unit 100 and selecting a corresponding indication location.

Furthermore, referring to the arrows shown in (b) and (c) of FIG. 4, in an input operation performed in the input unit 100 according to the present invention, the first rolling motion 611 of the input unit includes the rolling motion of a finger for moving the finger in a left-middle-right (611) form based on the center of the fingerprint legion 600 of the finger that has moved from the first input unit 111 to the front side with respect to the indication locations 120 of the second input unit 112 and selecting a corresponding indication location. Furthermore, the first rolling motion 611 of the input unit includes the rolling motion of a finger for moving the finger in the left-middle-right (611) form based on the center of the fingerprint region 600 of the finger that has moved from the first input unit 111 to the back side with respect to the indication locations 120 of the third input unit 113 and selecting a corresponding indication location.

Referring to FIGS. 1 and 7 to 9, in the input unit 100 according to the present invention, the detection unit 200 for detecting a selection or an input from a user when the selection or input is performed may include any one of a pressure sensor and a tactile sensor, or may include a touch pad or a touch screen. In this case, the control unit 300 distinguishes and determines a selection or a corresponding input in input signals generated by detecting the selection or input of the user, extracts data, allocated to the determined input signal, from the memory unit 400 in which allocated input signals have been stored, and performs the input of the data.

Referring to FIGS. 21, 22, 23, 24, and 25, in the data input apparatus according to the present invention, the term "data" refers information or data, such as a number, a letter, a symbol, a special symbol, a sound, a figure, and a video input or output to or from a computer, an electronic device, an electronic device interface, one of various terminals, or a mobile device. For example, the letter includes a Hangul letter, an English letter, a Japanese letter, and a Chinese character.

The input unit 100 according to the present invention may be provided in various forms, such as an elastic or non-elastic material form.

The input unit is a single data input apparatus. The input unit may be connected to various types of electronic devices or terminals via a wired or wireless connection, and may perform data inputs.

The input unit 100 according to the present invention may be configured in a terminal of one or more of an integration type, a slide type, a table type, a detachable type and a stand type in various forms.

The configurations and embodiments of the data input apparatus 1 according to the present invention are described in detail below with reference to the accompanying drawings.

Embodiment 1

Figure 30:
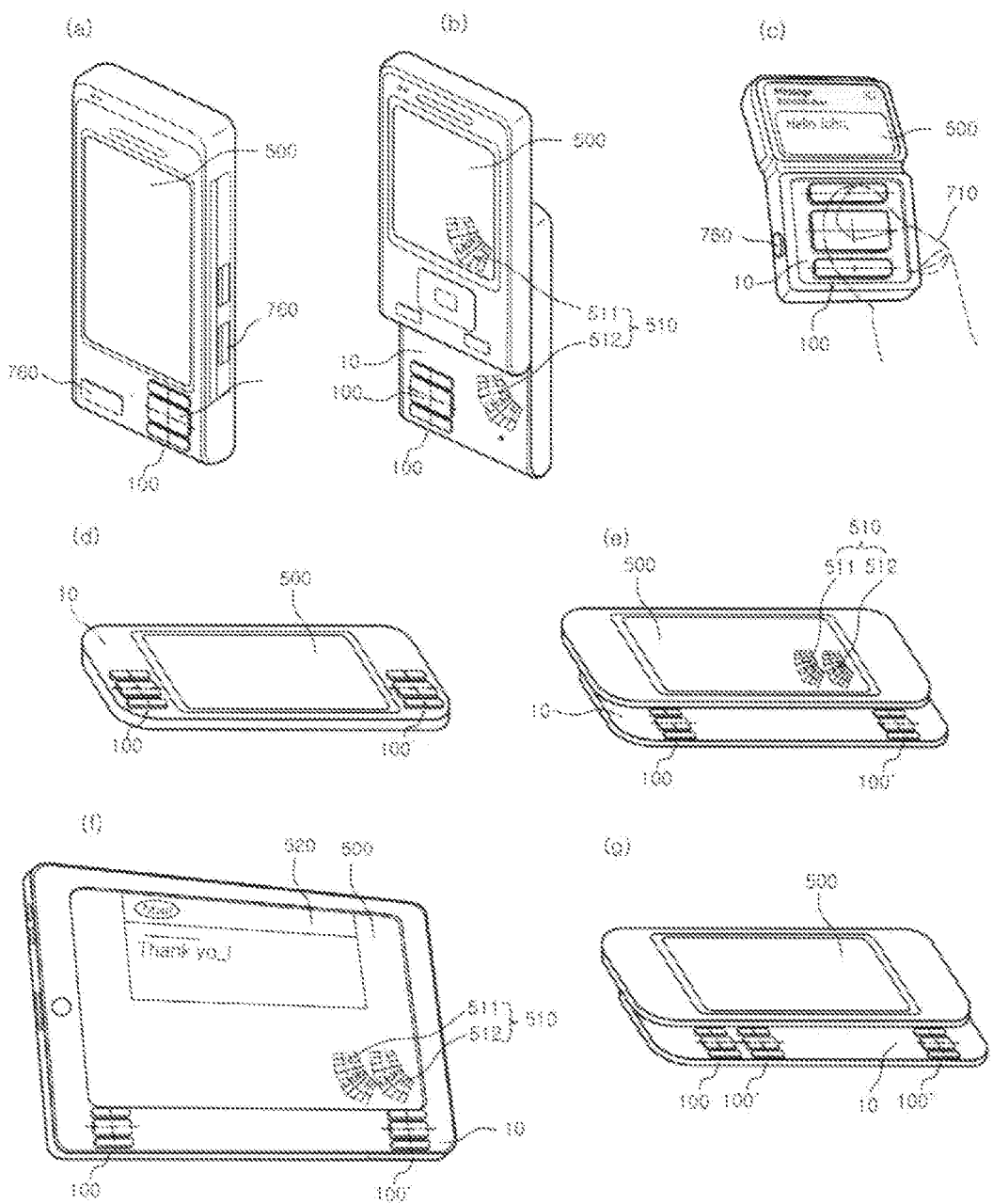
FIGS. 30 and 31 are exemplary diagrams illustrating that the data input apparatus according to the present invention is configured in various terminals or mobile devices.
Figure 31:
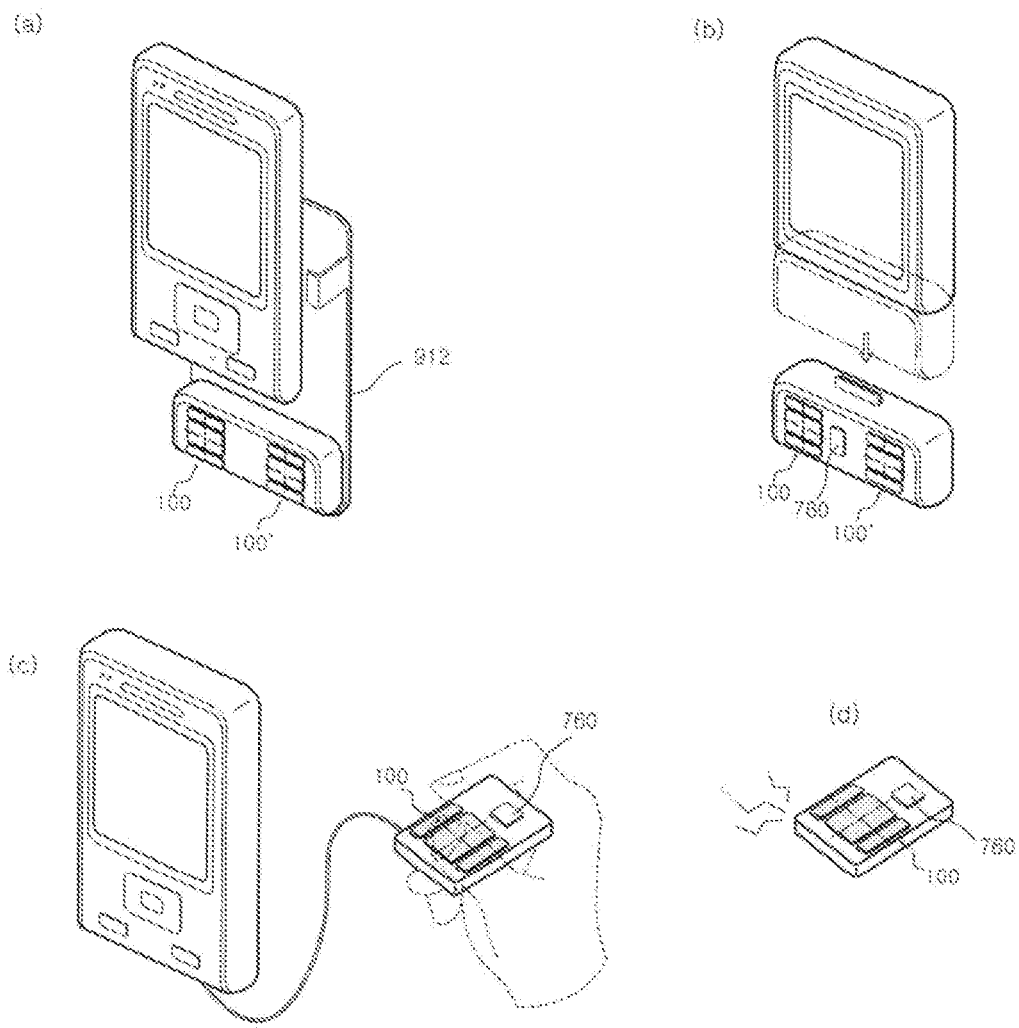
Figure 32:
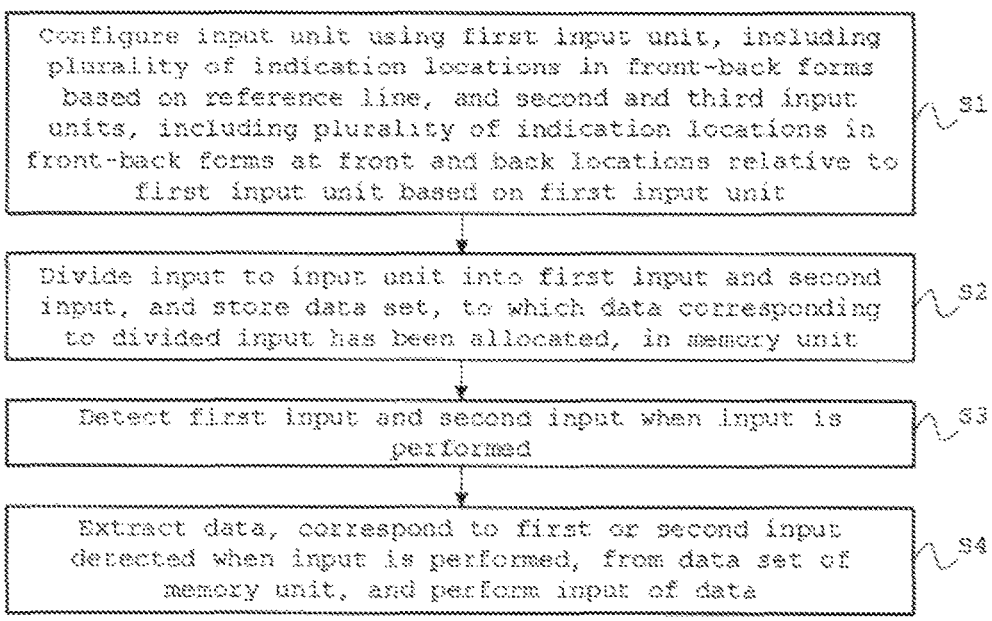
FIG. 32 is a flowchart illustrating a data input method performed in the data input apparatus according to an embodiment of the present invention.

As shown in FIGS. 2, 30, and 31, in the data input apparatus 1 according to the present invention, the input unit 100 is provided at a specific location of the base 10. The input unit is configured in various forms in computers, electronic devices, various terminals, and mobile devices.

In this case, the input unit 100 of the aforementioned data input apparatus 1 according to the present invention is applied to the input unit. In this case, referring to FIGS. 3 and 10, inputs to the input unit 100 according to the present invention include a first input in which one or more of the indication locations 120 of the first input unit 111 are selected. That is, in the input unit, the first input is performed as a fast separate input for selecting one indication location 120 of the first front indication locations 121 and first back indication locations 122 of the first input unit 111, or as a first pair input for selecting a pair of the first front indication location 121 and first back indication location 122 of the first front indication locations 121 and first back indication locations 122 of the first input unit 111. In this case, the control unit 300 performs the input of data allocated to a corresponding indication location in the first separate input, and performs the input of new data different from the data allocated to the corresponding indication location in the first pair input. Furthermore, an input to the input unit 100 according to the present invention includes a second input for selecting one or more of the indication locations 120 of the first input unit 111 to the third input unit 113. That is, in the input unit, the second input is performed as a second separate input for selecting one of the indication locations 120 of the second input unit 112 or selecting one of the indication locations 120 of the third input unit 113 or as a second pair input for selecting both one first front indication location 121 of the indication locations of the first input unit to the third input unit and one second indication location 125 spaced apart from the first front indication location and placed at a location corresponding to the first front indication location or selecting both one first back indication location 122 of the indication locations of the first input unit to the third input unit and one third indication location 127 spaced apart from the first back indication location and placed at a location corresponding to the first back indication location. In this case, the control unit 300 performs the input of data allocated to a corresponding indication location in the second separate input, and performs the input of new data different from the data allocated to the corresponding indication location in the second pair input.

Figure 7:
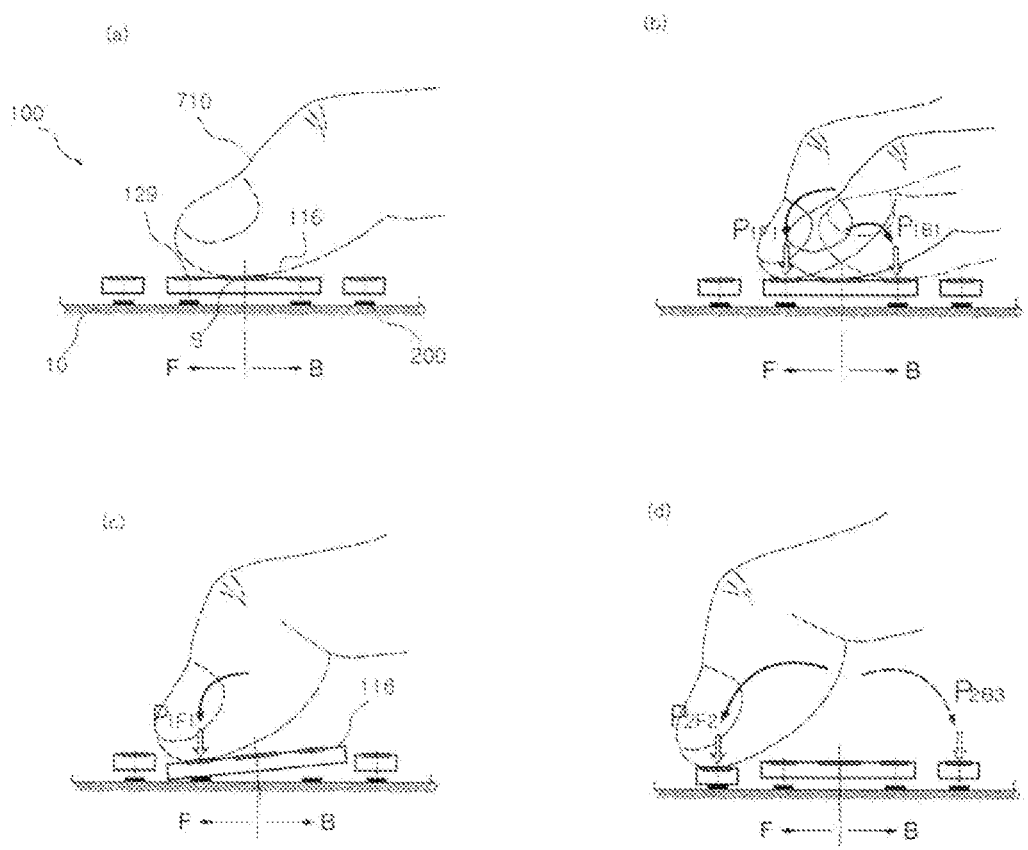
FIG. 7 is an exemplary diagram illustrating separate inputs performed in the input unit according to the present invention and corresponding input operations.
Figure 10:
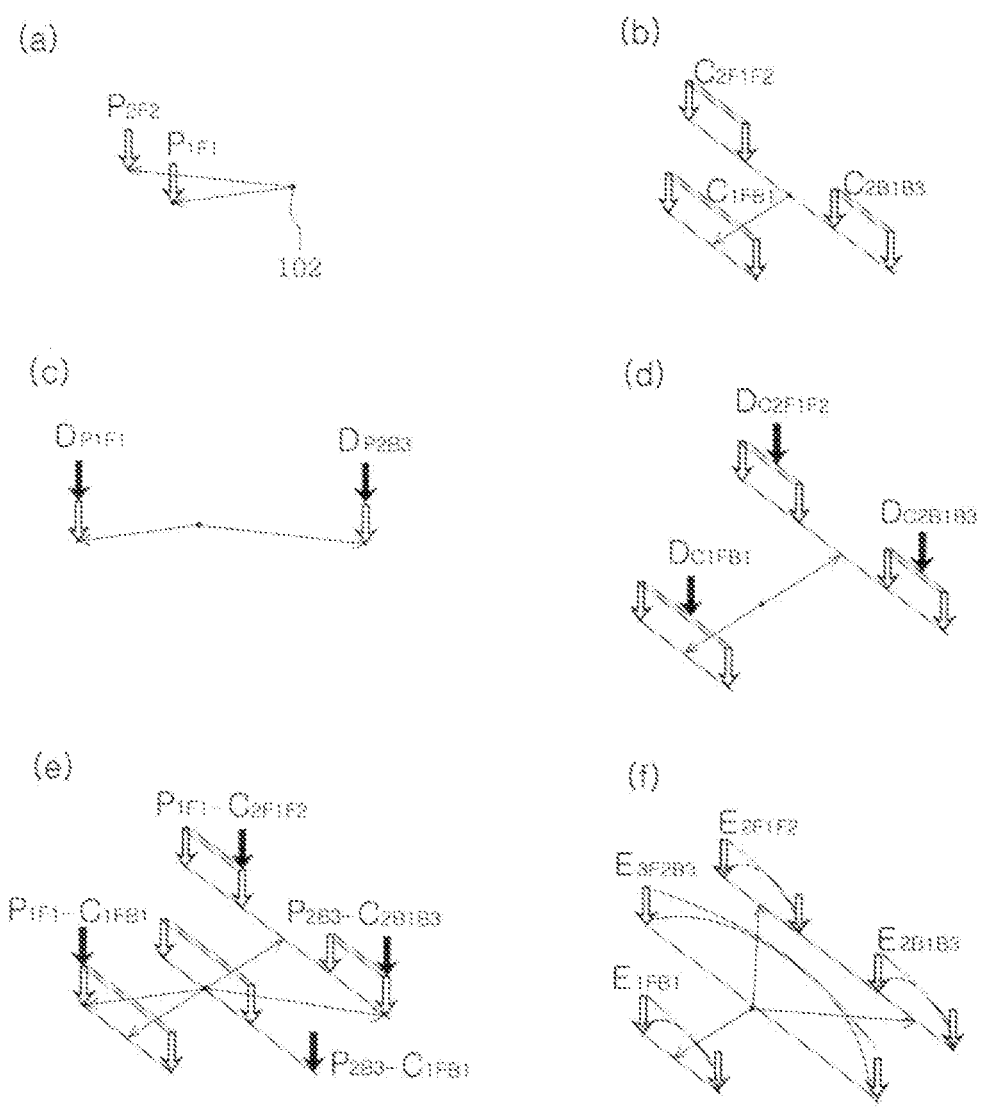
FIG. 10 is an exemplary diagram illustrating various forms of inputs performed in the input unit according to the present invention.
Figure 11:
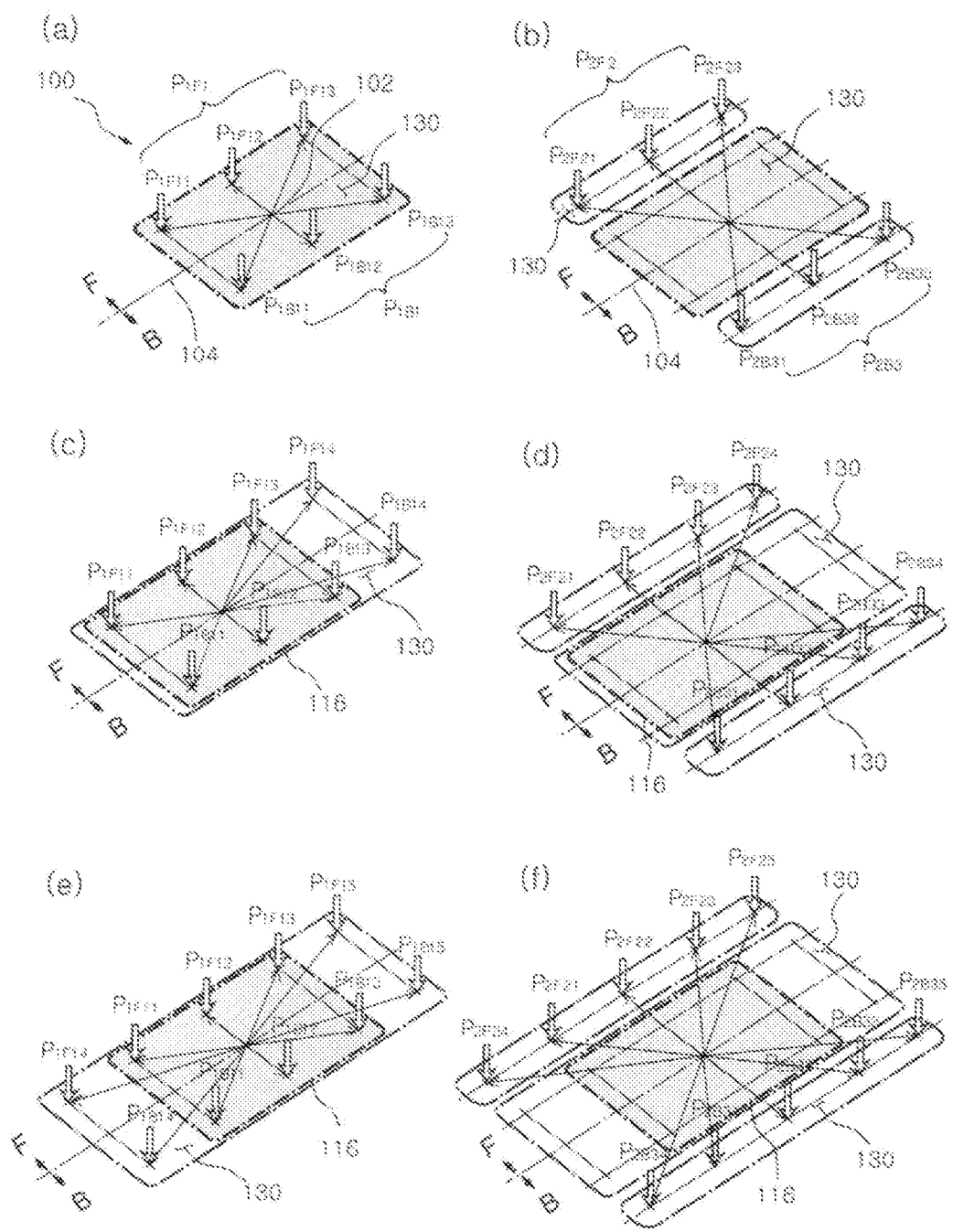
FIG. 11 is an exemplary diagram illustrating separate inputs performed in the input unit according to the present invention.

As shown in (b) and (c) of FIG. 7, (a) of FIG. 10, and (a) of FIG. 11, the first input performed in the input unit 100 according to the present invention includes a first separate input P1F1 or P1B1 for independently selecting one indication location 120 of the first front indication locations 121 and first back indication locations 122 of the first input unit 111 configured in the input unit. In this case, the control unit 300 performs the input of data allocated to a corresponding indication location in the first separate input.

In other words, referring to (a) of FIG. 11, in the first separate input of the inputs to the input unit 100 according to the present invention, one first front indication location 121 is independently selected (P1F1) from the first front indication locations and first back indication locations F11-B11, F12-B12 and F13-B13 of the first input unit 111 and then a data input is performed, or one first back indication location 122 is independently selected (P1B1) from the first front indication locations and first back indication locations and then a data input is performed. In this case, P1F1 shown in (b) of FIG. 7, (a) of FIG. 10 and (a) of FIG. 11 is indicative of first separate inputs P1F11, P1F12 and P1F13 respectively performed at the first front indication locations F11, F12 and F13 of the first input unit 111, and P1B1 shown in (b) of FIG. 7 and (a) of FIG. 11 is indicative of first separate inputs P1B11, P1B12 and P1B13 respectively performed in the first back indication locations B11, B12 and B13 of the first input unit 111. However, inputs according to the present invention are not limited thereto.

In the input unit, an input operation when an input is performed may be performed in such a way as to push or touch the selection unit 129 corresponding to each of the indication locations 120 of the first input unit. Furthermore, in the input unit, an input may be performed by various types of input operations including a finger rolling motion.

Figure 8:
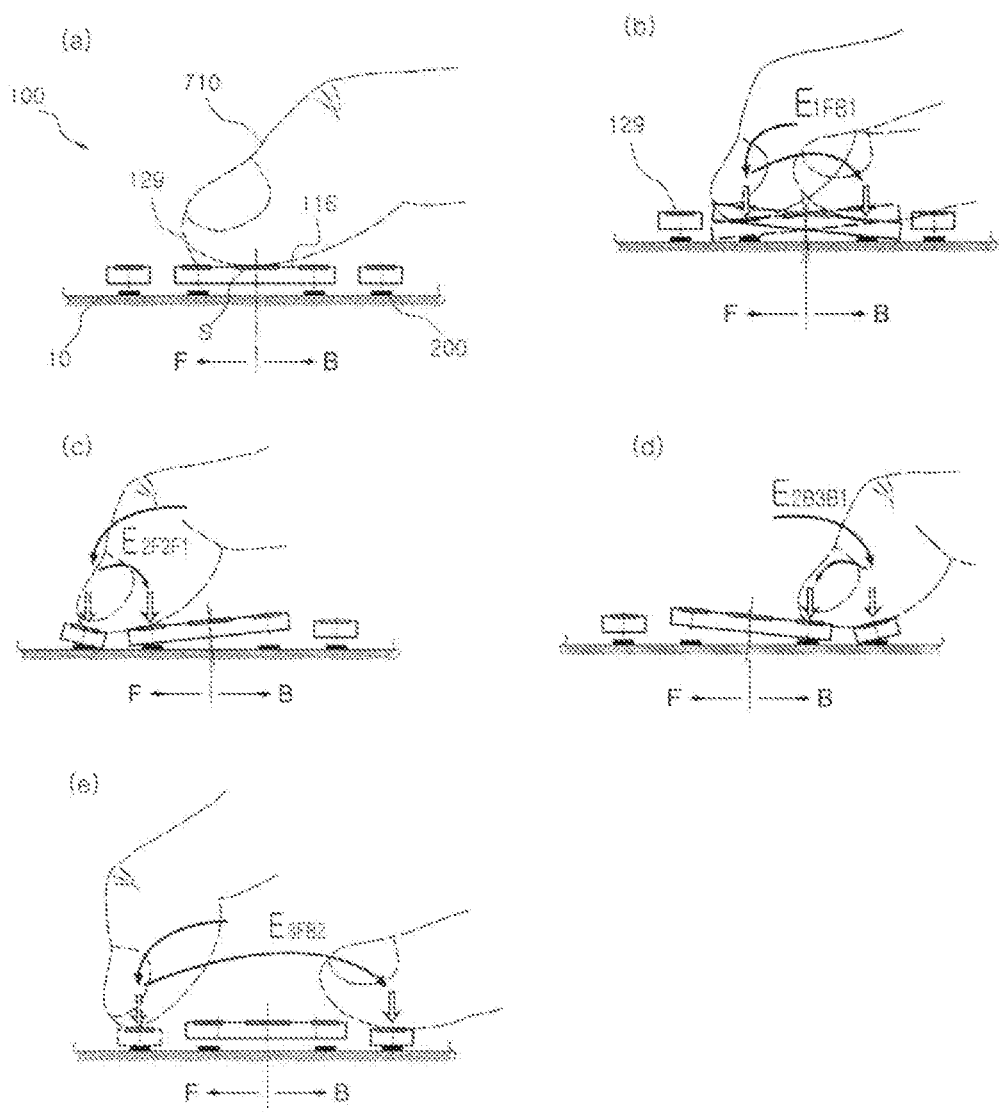
FIG. 8 is an exemplary diagram illustrating pair inputs performed in the input unit according to the present invention and corresponding input operations.
Figure 12:
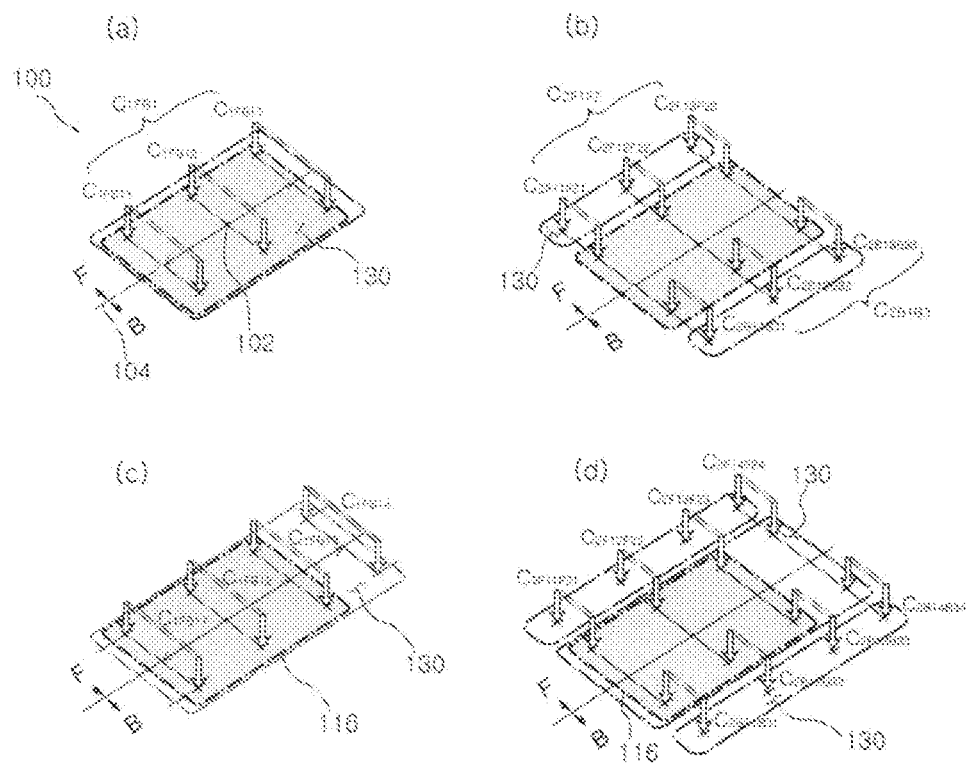
FIGS. 12 and 13 are exemplary diagrams illustrating pair inputs performed in the input unit according to the present invention.

Meanwhile, as shown in (b) of FIG. 8, (b) of FIG. 10, and (a) of FIG. 12, the first input performed in the input unit 100 according to the present invention includes a first pair input C1FB1 for selecting a pair of the first front indication location 121 and first back indication location 122 of the first front indication locations 121 and first back indication locations 122 of the first input unit 111 configured in the input unit. In this case, the control unit 300 performs the input of new data different from data allocated to a corresponding indication location in the first pair input.

In other words, referring to (a) of FIG. 12, in the first pair input of inputs to the input unit 100 according to the present invention, the pair of first front indication location 121 and first back indication location 122 is selected (C1FB1) from the first front indication locations and first back indication locations F11-B11, F12-B12 and F13-B13 of the first input unit 111, and then a data input is performed. In this case, C1FB1 shown in (b) of FIG. 8, (b) of FIG. 10, and (a) of FIG. 12 is indicative of first pair inputs C1FB11, C1FB12 and C1FB13 respectively performed at the first front indication locations and first back indication locations F11-B11, F12-B12, and F13-B13 of the first input unit 111.

In the input unit, an input operation when an input is performed may be performed in such a way as to push or touch both two selection units 129 corresponding to the first front indication location 121 and first back indication location 122 of the first input unit. Furthermore, the input may be performed by various types of input operations including a finger rolling motion.

Referring to (b) of FIG. 8, in the first pair input, of the input unit 100 according to the present invention, if the pair of first front indication location 121 and first back indication location 122 does not simultaneously touch the detection sensor of the detection unit 200, the control unit 300 may determine two sequential signals, related to the locations that do not simultaneously touch the detection sensor, to be the first pair input C1FB1 based on a predetermined setting time value, and then may perform an input.

In other words, in the input unit 100, such as (a) of FIG. 12, when the first pair input C1FB1 is performed, the pair of first front indication location 121 and first back indication location 122 of the first front indication locations 121 and first back indication locations 122 of the first input unit 111 may not simultaneously touch the detection sensor of the detection unit 200. That is, when the first pair input C1FB1 is performed, the B11 indication location subsequent to the F11 indication location may touch the detection sensor, or the F11 indication location subsequent to the B11 indication location may touch the detection sensor.

In such a case, the control unit 300 may determine two sequential signals, related to the locations that do not simultaneously touch the detection sensor, to be the first pair input based on a predetermined setting time value, and then may perform input processing. That is, when the pair of first front indication location 121 and first back indication location 122 is selected in the input unit 100, the control unit 300 determines contact signals to be the first pair input if the time difference between the points of time at which the contact signals are generated in response to the contact of the first front indication location 121 with the detection sensor and the contact of the first back indication location 122 with the detection sensor is within the predetermined setting time value regardless of order of the generated signals, and then performs an input. In this case, the range of the setting time value may be within 0.2 second, or may be determined by taking into account the common difference between the points of time at which contacts are simultaneously made. Furthermore, in addition to the setting value, corresponding input signals may be determined based on two different sequential signals generated from the pair of first front indication location 121 and first back indication location 122 of the indication locations 120 of the input unit using various means, and input processing may be performed the corresponding input signals as the first pair input.

Referring to (a) of FIG. 5 and FIG. 6, in the input unit 100 according to the present invention, as soon as a finger is placed on the input unit 100 as shown in (g) of FIG. 6, the locations of the selection unit 129 corresponding to the indication locations 120 of the first input unit 111 are recognized as the selection unit 129 in left-middle-right forms based on the center of the fingerprint region 600 of the finger. In other words, as shown in (a) of FIG. 5 and (g) of FIG. 6, in the input unit 100 according to the present invention, when a finger touches the input face 130 of the first input unit 111, the locations of the selection unit 129 corresponding to the indication locations F11-B11, F12-B12 and F13-B13 disposed in the first input unit are recognized in left-middle-right (630-640-650) forms based on the center (SS in (b) of FIG. 5) of the fingerprint region 600 of the finger. In this case, as shown in (a) and (b) of FIG. 4, the left-middle-right (630-640-650) forms relative to the first input unit are respectively recognized as the left front-left back (631-632), middle front-middle back (641-642), and right front-right back (651-652) forms of the front-back forms based on the reference line 104. Accordingly, a user may easily and rapidly perform data inputs independently or sequentially in the state in which the user has been easily accustomed to the locations of the selection unit 129 of the first input unit by recognizing the indication locations 120 of the first input unit 111 in the input unit.

Referring to (c) to (g) of FIG. 5 and FIG. 6, in inputs to the input unit 100 according to the present invention, the rolling motion of the fingerprint region 600 of the finger is a finger (710) input operation performed in such a manner that the fingerprint region 600 of the finger touches the input face 130 of the input unit 100 touched by an input means and the finger is rolled and moved. In this case, the control unit 300 determines input signals generated from the respective indication locations 120 of the input unit in response to the finger rolling motion, and performs the input of the corresponding data of the determined input signals. In the input unit, immediately after an input selection for a user's finger is performed when an input is performed, the finger naturally returns to the center (S in the drawing) of the first input unit 111. Accordingly, a user may easily and rapidly perform a subsequent input operation or sequential input in the state in which the input is being performed.

For example, as shown in FIG. 6, if the B13 indication location is selected immediately after the F11 indication location of the indication locations 120 disposed in the first input unit 111 of the input unit 100 according to the present invention is selected, first, when a finger is placed on the input unit 100 as shown in (g) of FIG. 6, the indication locations 120 of the first input unit 111 are recognized as respective input selection locations in front-back forms based on the reference line 104. In such an input unit 100, when the left front portion 631 of the first input unit 111 is pushed (P1F11), the finger naturally returns to the center (S in (g) of FIG. 6) of the first input unit immediately after the F11 indication location is selected. Thereafter, when the right back portion 652 of the first input unit 111 is pushed (P1B13), the B13 indication location is selected. In other words, in the input unit, the form of the finger placed on the input unit naturally returns from the form of the finger ((a) to (f) of FIG. 6 and (h) to (m) of FIG. 6) in which the indication location 120 is selected in each input of the input unit to the form of the finger ((g) of FIG. 6) in which the finger is placed on the first input unit 111 or the input central portion 116 after the selection. That is, when performing an input according to the aforementioned moving line of the finger, a user may perform two input operations via a single connection operation. Accordingly, a user may intuitively perform a required input easily and rapidly.

Referring to finger forms related to FIG. 6, in the input unit 100 according to the present invention, in various finger forms when inputs are performed, the natural return (g of FIG. 6) to the form of the finger ((g) of FIG. 6) in which the finger is placed on the first input unit 111 or input central portion 116, i.e., the center of the input unit 100, may be a phenomenon accompanied by the shape of the input unit 100 corresponding to the fingerprint region 600 of the finger.

As shown in (d) of FIG. 7, (a) of FIG. 10, and (b) of FIG. 11, the second input performed in the input unit 100 according to the present invention includes a second separate input P2F2 for independently selecting one of the indication locations 120 of the second input unit 112 configured in the input unit, or a second separate input P2B3 for independently selecting one of the indication locations 120 of the third input unit 113 configured in the input unit. In this case, the control unit 300 performs the input of data allocated to a corresponding indication location in the second separate input.

In other words, referring to (b) of FIG. 11, in the second separate input of inputs to the input unit 100 according to the present invention, one second indication location 125 is independently selected (P2F2) from the second indication locations F21, F22 and F23 of the second input unit 112 configured in the input unit, and then a data input is performed. Furthermore, in the second separate input, one third indication location 127 is independently selected (P2B3) from the third indication locations B31, B32 and B33 of the third input unit 113 configured in the input unit, and then a data input is performed. In this case, P2F2 shown in (d) of FIG. 7, (a) of FIG. 10 and (b) of FIG. 11 is indicative of second separate inputs P2F21, P2F22 and P2F23 respectively performed at the second indication locations F21, F22 and F23 of the second input unit 112 and P2B3 shown in (d) of FIG. 7 and l of FIG. 11 is indicative of second separate inputs P2B31, P2B32 and P2B33 respectively performed at the third indication locations B31, B32 and B33 of the third input unit 113.

In the input unit, an input operation when an input is performed may be performed in such a way as to push or touch the selection unit 129 corresponding to each of the indication locations 120 of the second input unit or each of the indication locations 120 of the third input unit. Furthermore, in the input unit, an input may be performed by various types of input operations including a finger rolling motion.

For example, referring to (g) of FIG. 5 and (d) of FIG. 7, in an input operation for selecting each of the indication locations 120 of the second input unit, the finger is moved in an arrow form (a solid line) from the reference line to the front side (F in the drawing) based on the reference line 104 of the input unit, and then a corresponding indication location when an input is performed may be selected. Furthermore, referring to (g) of FIG. 5 and (d) of FIG. 7, in an input operation for selecting each of the indication locations 120 of the second input unit, the finger is moved in an arrow form (a solid line) from the first input unit to the front side (F in the drawing) based on the central portion of the first input unit, and then a corresponding indication location when an input is performed may be selected.

For another example, referring to (g) of FIG. 5 and (d) of FIG. 7, in an input operation for selecting each of the indication locations 120 of the third input unit, the finger is moved in an arrow form (a dotted line) from the reference line to the back side (B in the drawing) based on the reference line 104 of the input unit, and then a corresponding indication location when an input is performed is selected. Furthermore, referring to (g) of FIG. 5 and (d) of FIG. 7, in an input operation for selecting each of the indication locations 120 of the third input unit, the finger is moved in an arrow form (a dotted line) from the first input unit to the back side (B in the drawing) based on the central portion of the first input unit, and then a corresponding indication location when an input is performed is selected.

Figure 19:
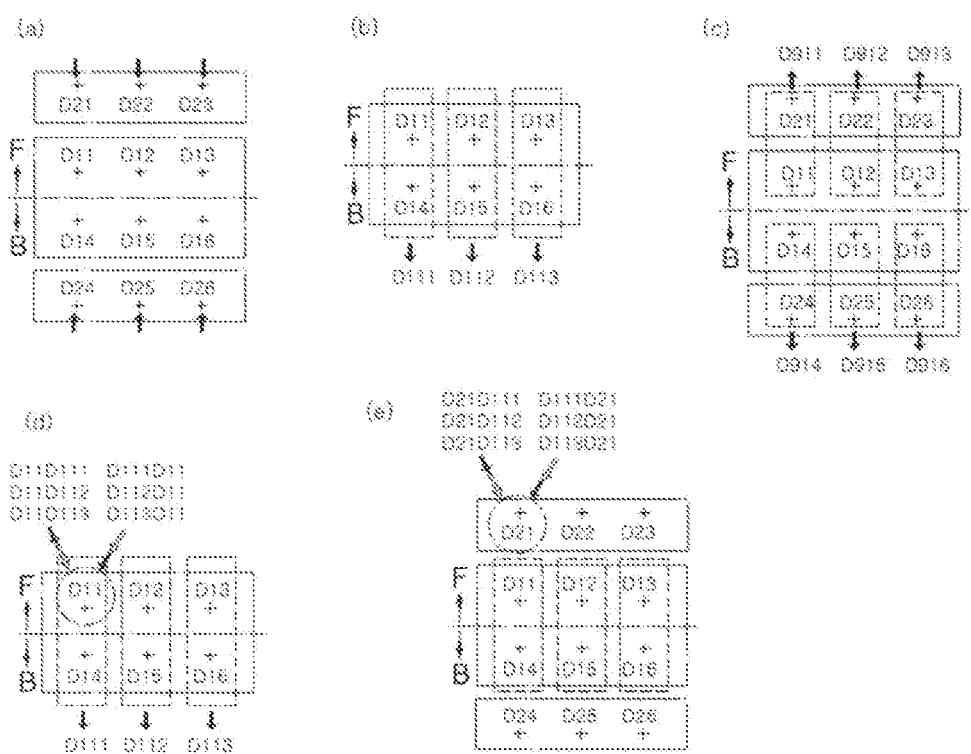
FIGS. 19 and 20 are exemplary diagrams illustrating the generation of data according to various forms of inputs performed in the input unit according to the present invention.

In this case, in the input unit 100, such as (b) of FIG. 11, if the indication location B32 of the third input unit 113 is an input target, when the back middle portion (672 in (a) of FIG. 4) of the first input unit 111 is selected based on the location recognition of the aforementioned indication locations 120 of the input unit 100 (in the location recognition described with reference to FIG. 4), the indication location B32 disposed at the location of the back middle portion 672 is independently selected, and then the second separate input P2B32 is performed. That is in the input unit, the second input is performed as the second separate input P2B32 for the indication location B32 of the input target. In such a case, the control unit 300 performs the input of data (D25 in (a) of FIG. 19) allocated to the corresponding indication location B32 in the second separate input P2B32 of the input unit. That is, as shown in (b) of FIG. 21, the data 'D25' may be displayed on a display unit 500 as an alphabetical letter 'R.'

Meanwhile, as shown in (c) to (d) of FIG. 8, (b) of FIG. 10 and (b) of FIG. 12, the second input performed in the input unit 100 according to the present invention includes a second pair input C2F1F2 or C2B1B3 for selecting both one first front indication location 121 of the indication locations 120 of the first input unit 111 to the third input unit 113 configured in the input unit and one second indication location 125 spaced apart from the first front indication location and disposed at a location corresponding to the first front indication location or for selecting both one first back indication location 122 and one third indication location 127 spaced apart from the one first back indication location 122 and disposed at a location corresponding to the one first back indication location 122. In this case, the control unit 300 performs the input of new data different from data allocated to a corresponding indication location in the second pair input.

In other words, C2F1F2 shown in (c) of FIG. 8, (b) of FIG. 10 and (b) of FIG. 12 is indicative of second pair inputs C2F11F21, C2F12F22, and C2F13F23 by which the first front indication locations F11, F12 and F13 of the first input unit 111 and the second indication locations F21, F22 and F23 of the second input unit 112 spaced apart from one another and disposed at respective locations corresponding to the indication locations of the first front indication locations are selected together (F11-F21, F12-F22 or F13-F23) and then performed. Furthermore, C2B1B3 shown in (d) of FIG. 8, (b) of FIG. 10, and (b) of FIG. 12 is indicative of second pair inputs C2B11B31, C2B12B32, and C2B13B33 by which the first back indication locations B11, B12, and B13 of the first input unit 111 and the third indication locations B31 B32, and B33 of the third input unit 113 spaced apart from one another and disposed at respective locations corresponding to the indication locations of the first back indication locations are selected together (B11-B31 or B12-B32 or B13-B33) and then performed.

In this case, in the input unit 100, such as (b) of FIG. 12, if the F12 indication location of the first input unit 111 and the F22 indication location of the second input unit 112 are input targets, and when the middle front portion (641 in (b) of FIG. 4) of the first input unit 111 and the front middle portion (662 in (c) of FIG. 4) of the first input unit are selected together based on the location recognition of the aforementioned indication locations 120 of the input unit 100 (in the location recognition described with reference to FIG. 4), the F12 indication location disposed at the location of the middle front portion 641 and the indication location F22 disposed at the location of the front middle 662 are selected together, and the second pair input C2F12F22 is performed. That is, in the input unit, the second input is performed as the second pair input C2F12F22 for the indication location F12 and the indication location F22 of the input targets. In this case, the control unit 300 performs the input of new data D912 different from data (D12 and D22 in (c) of FIG. 19) allocated to the corresponding indication locations F12 and F22 in the second pair input C2F12F22 of the input unit. That is, as shown in (b) of FIG. 21 and (c) of FIG. 19, the data 'D912' may be displayed on the display unit 500 as new data (an alphabetical letter 'W') different from the data 'D12' (an alphabetical letter 'C') and the data 'D22' (an alphabetical letter 'Q').

Referring to (c) and (d) of FIG. 8, in the second pair input of the input unit 100, when an input is performed, one first front indication location 121 and one second indication location 125 spaced apart from the first front indication location and disposed at a location corresponding to the first front indication location may not simultaneously touch the detection sensor of the detection unit 200. Furthermore, when an input is performed, one first back indication location 122 and, one third indication location 127 spaced apart from the first back indication location and disposed at a location corresponding to the first back indication location may not simultaneously touch the detection sensor of the detection unit 200. In such a case, the control unit 300 may determine two sequential signals, related to the locations that do not simultaneously touch the detection sensor, to be the second pair input C2F1F2 or C2B1B3 based on a predetermined setting time value, and then may perform an input.

In the input unit, an input operation when an input is performed may be performed in such a way as to push or touch both one first front indication location 121 of the first input unit and one second indication location 125 spaced apart from the first front indication location and disposed at a location corresponding to the first front indication location. Furthermore, in the input unit, an input operation when an input is performed may be performed in such a way as to push or touch one first back indication location 122 of the first input unit and one third indication location 127 spaced apart from the first back indication location and disposed at a location corresponding to the first back indication location. Furthermore, in the input unit, an input may be performed by various types of input operations including a finger rolling motion.

Referring to FIGS. 3 and 11 to 18, the input unit 100 according to the present invention may further include one or more indication locations 120 for generating an input signal in response to a selection when an input is performed on the left or right side of the input unit.

For example, in the input unit, as shown in (b) of FIG. 3, a pair of the first front indication location 121 and the first back indication location 122 may be further provided on the left side of the first input unit 111, a single second indication location 125 may be further provided on the left side of the second input unit 112, and a single third indication location 127 may be further provided on the left side of the third input unit 113. Furthermore, in the input unit, as shown in (c) of FIG. 3, a pair of the first front indication location 121 and the first back indication location 122 may be further provided on the right side of the first input unit 111, a single second indication location 125 may be further provided on the right side of the second input unit 112, and a single third indication location 127 may be further provided on the right side of the third input unit 113.

For another example, in the input unit, a plurality of indication locations 120 for generating an input signal in response to a selection when an input is performed may be further provided on the left and right sides of the input unit. In this case, as shown in (d) of FIG. 3, in the input unit, a pair of the first front indication location 121 and the first back indication location 122 may be respectively further provided on the left and right sides of the first input unit 111, a single second indication location 125 may be further provided on each of the left and right sides of the second input unit 112, and a single third indication location 127 may be further provided on each of the left and right sides of the third input unit 113.

In such a case, as shown in (b) to (d) of FIG. 3, an input central portion 116 in which three pairs of the first front indication locations 121 and the first back indication locations 122 have been arranged in the left-middle-right (630-640-650) forms at specific intervals along the reference line based on the reference point 102, i.e., a reference location, is formed in the first input unit 111 of the input unit according to the present invention.

In other words, the input central portion is recognized as a single central portion in the input unit 100 according to the present invention. Accordingly, in the input unit 100, such as (b) of FIG. 3, the indication locations F14, B14, B24 and B34 of the first input unit 111 to the third input unit 113 further provided on the left side of the input units F11, B11, F12, B12, F13, B13, F21, F22, F23, B31, B32 and B33 according to the present invention are recognized as being on the left side (c of FIG. 4, 680) of the input central portion based on the input central portion 116 formed in the first input unit 111. Furthermore, in the input unit 100, such as (c) of FIG. 3, the indication locations F14, B14, B24 and B34 of the first input unit 111 to the third input unit 113 further provided on the right side of the input units F11, B11, F12, B12, F13, B13, F21, F22, F23, B31, B32 and B33 according to the present invention are recognized as being on the right side ((c) of FIG. 4; 690) of the input central portion based on the input central portion 116 formed in the first input unit 111.

More specifically, in the input unit, the left side 680 of the first input units F11, B11, F12, B12, F13 and B13 that belongs to the left side 680 of the input central portion is recognized in the first left front-first left back (F14-B14, and 681-682) forms of the input central portion, as shown in (d) of FIG. 4. Furthermore, in the input unit, the left side 680 of the second input units F21, F22 and F23 that belongs to the left side 680 of the input central portion is recognized as a second left front (F24, 683) that is spaced apart from the first left front portion 681 placed on the left side of the input central portion and that is placed on the front side, as shown in (d) of FIG. 4. Furthermore, in the input unit, the left side 680 of the third input unit B31, B32 and B33 that belongs to the left side 680 of the input central portion is recognized as third left back portions B34 and 684 that are spaced apart from the first left back portion 682 placed on the left side of the input central portion and that are placed on the back side, as shown in (d) of FIG. 4. Furthermore, in the input unit, the right side 690 of the first input unit (F11, B11, F12, B12, F13, B13) that belongs to the right side 690 of the input central portion may be recognized in the first right front-first right back (691-692) forms of the input central portion, as shown in (d) of FIG. 4. Furthermore, in the input unit, the right side 690 of the second input units F21, F22 and F23 that belongs to the right side 690 of the input central portion is recognized as the second, right front (F24, 693) that is spaced apart from the first right front portion 691 placed on the right side of the input central portion and that is placed on the front side, as shown in (d) of FIG. 4. Furthermore, in the input unit, the right side 690 of the third input unit B31, B32 and B33 that belongs to the right side 690 of the input central portion is recognized as the third right backs B34 and 694 that are spaced apart from the first right back portion 692 placed on the right side of the input central portion and that are placed on the back side, as shown in (d) of FIG. 4.

Furthermore, referring to (b) to (d) of FIG. 3 and (c) and (d) of FIG. 4, in the input unit 100 according to the present invention, when a finger is placed from the first input unit 111 to the second input unit 112, the second left front portion 683 of the second input unit and the first left front portion 681 of the first input unit may be recognized as indication locations (front portion 683, and back portion 681) in front-back forms. Furthermore, in the input unit, when a finger is placed from the first input unit 111 to the third input unit 113, the first right back portion 692 of the first input unit and the third right back portion 694 of the third input, unit may be recognized as indication locations (front portion 692, and back portion 694) in front-back forms.

The location recognition of the indication locations 120 of the input unit 100 according to the present invention may be applied as the location recognition of corresponding indication locations in the location recognition described with reference to FIGS. 3 and 4 in the input unit of the following embodiments.

For example, in the input unit 100, such as (d) of FIG. 11, if the B34 indication location of the third input unit 113 is an input target and when the third right back ((c) of FIG. 4; 694) that is spaced apart from the first right back portion 692 placed on the right side of the input central portion 116 formed in the first input unit 111 and that is placed on the back side is selected based on the location recognition of the aforementioned indication locations 120 of the input unit 100 (in the location recognition described with reference to FIG. 4), the indication location B34 placed at the location of the third right back portion 694 is independently selected, and the second separate input P2B34 is performed. That is, in the input unit, the second input is performed on the indication location B34 of the input target as the second separate input P2B34.

Furthermore, in the input unit 100, such as (d) of FIG. 12, if the indication location F14 of the first input unit 111 and the indication location F24 of the second input unit 112 are input targets and when both the first right, front (691 in (c) of FIG. 4) of the input central portion 116 formed in the first input unit 111 and the second right front (693 in (c) of FIG. 4) spaced apart from the first right front portion 691 and placed on the front side are selected based on the location recognition of the aforementioned indication locations 120 of the input unit 100 (in the location recognition described with reference to FIG. 4), both the indication location F14 disposed at the location of the first right front portion 691 and the indication location F24 disposed at the location of the second right front portion 693 are selected, and then the second pair input C2F14F24 is performed. That is, in the input unit, the second input is performed on the indication location F14 and indication location F24 of the input targets as the second pair input C2F14F24.

Figure 21:
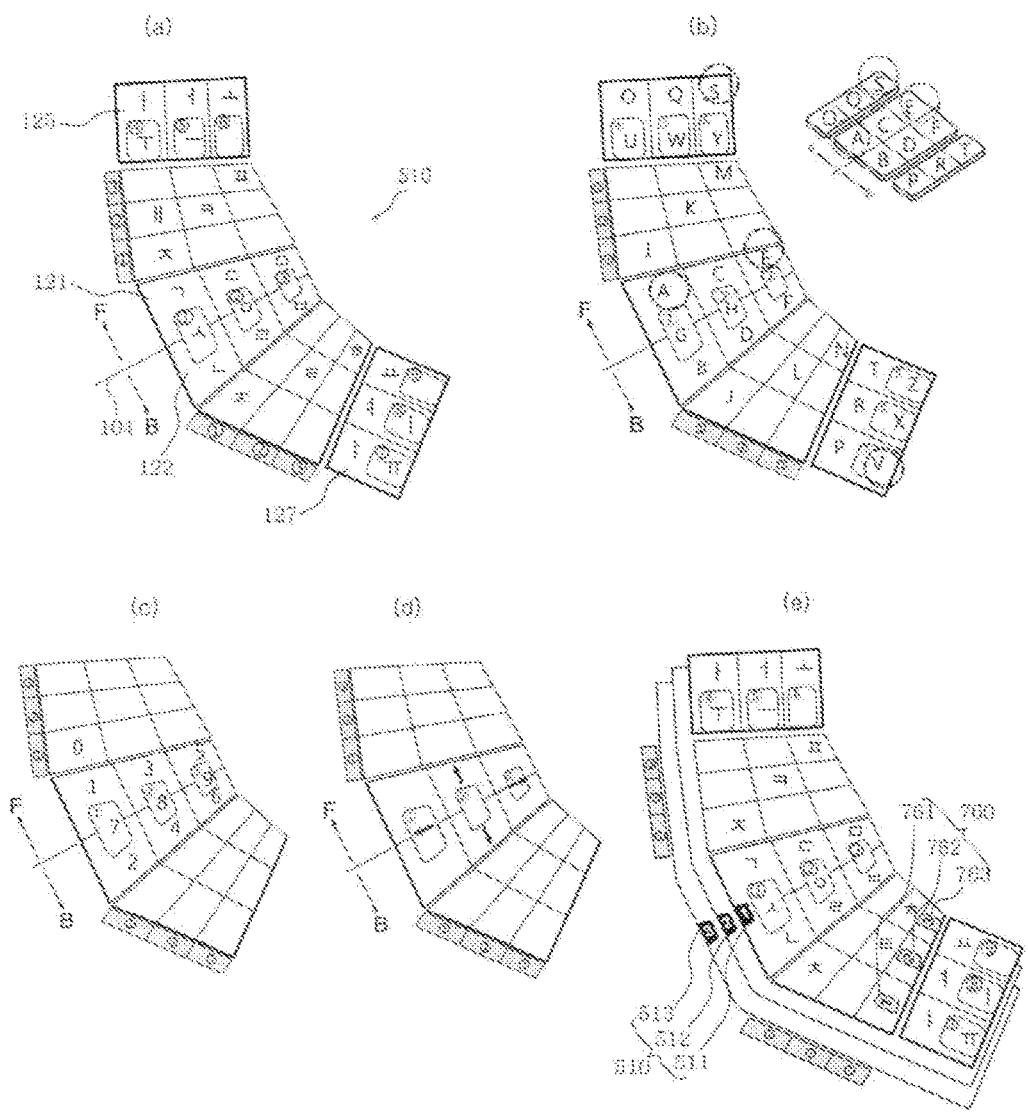
FIGS. 21 and 22 are exemplary diagrams illustrating the indication locations of a letter, numbers, and direction indication mode or data allocated to inputs in the input unit according to the present invention.
Figure 22:
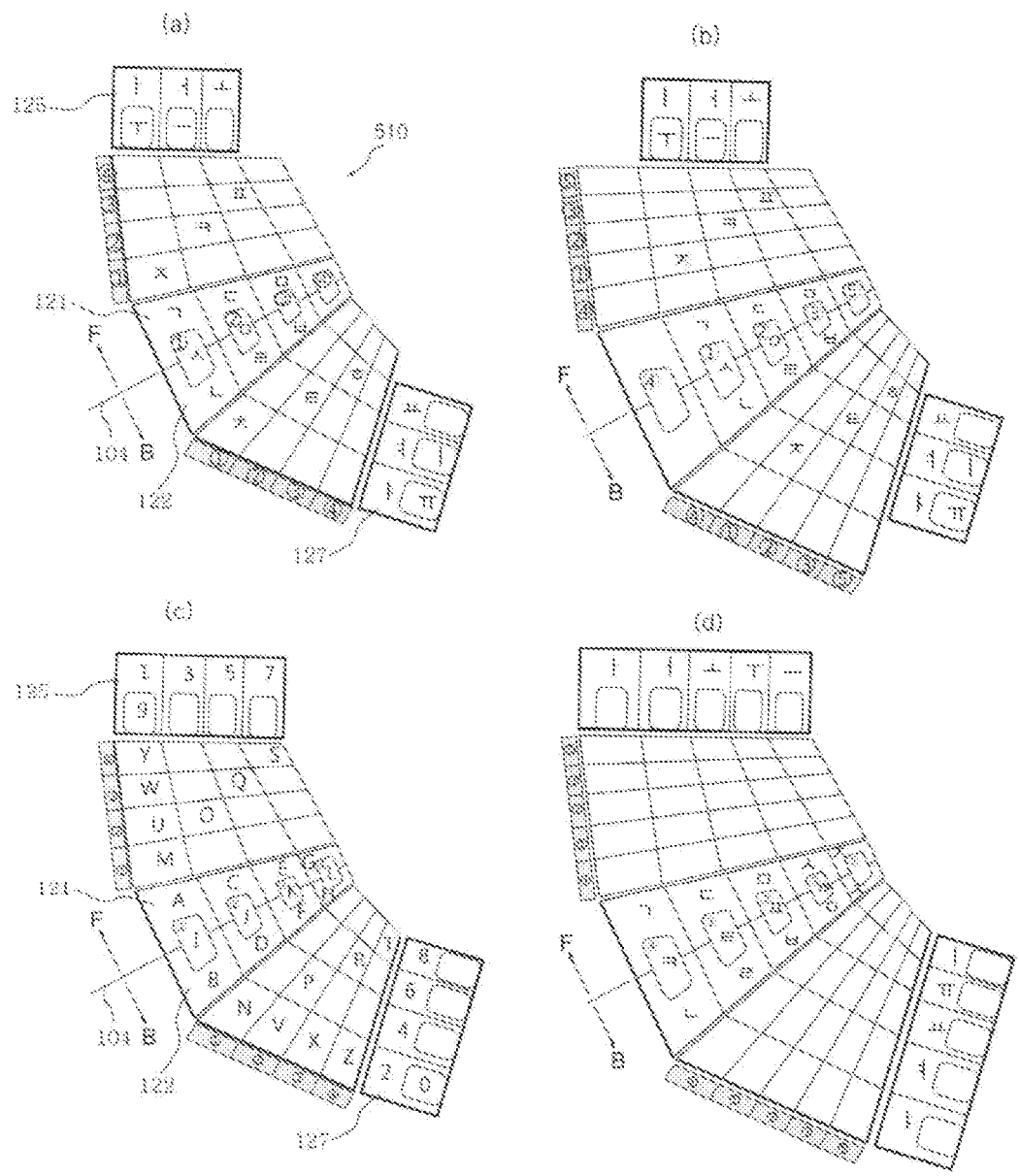

Referring to FIG. 21, in the input unit 100 according to the present invention, a data input 'SAVE', i.e., an example of an alphabetical letter input, is described below.

First, referring to (b) of FIG. 21, when a finger is placed on the input unit 100 according to the present invention, the indication locations 120 to which the input target 'SAVE' has been allocated is recognized based on the location recognition of the aforementioned indication locations 120 of the input unit 100 (in the location recognition described with reference to FIG. 4). Accordingly, when the front right portion ((b) of FIG. 4; 663) of the first input unit 111 is selected in the input unit, the indication location F23 disposed at the location of the front right portion 663 is independently selected (the second separate input, P2F23), and thus 'S' is input. When the left front portion (631 in (c) of FIG. 4) of the first input unit is selected, the indication location F11 disposed at the location of the left front portion 631 is independently selected (the first separate input; P1F11), and thus 'A' is input. When both the left back portion (632 in (c) of FIG. 4) and the back-side left portion (671 in (c) of FIG. 4) of the first input unit are selected, both the indication location B11 and the indication location B31 respectively disposed at the locations of the left back portion 632 and the back-side left portion 671 are selected (the second pair input; C2B11B31), and thus 'V' is input. When the right front portion (651 in (c) of FIG. 4) of the first input unit is selected, the indication location F13 disposed at the location of the right front portion 651 is independently selected (the first separate input; P1F13), and thus 'E' is input. That is, the alphabetical letter input 'SAVE' is completed by the sequential input of the second separate input P2F23, the first separate input P1F11, the second pair input C2B11B31 and the first separate input P1F13. In this case, in the input unit, an input may be performed by various input operations including the aforementioned rolling motions of a finger fingerprint form.

In the inputs to the input unit 100 according to the present invention, after each input selection, the finger naturally returns to the center (S in the drawing) of the first input unit 111 immediately after the pushing or contact of the finger has been released. Furthermore, a user can intuitively recognize a selected location for the indication locations 120 of the input unit 100 based on the location recognition of the aforementioned indication locations 120 of the input unit 100 (in the location recognition described with reference to FIG. 4). In such an input unit, a user may perform a plurality of data inputs easily independently or sequentially. Furthermore, in the input unit, a user may perform two or more input operations sequentially and rapidly.

Figure 13:
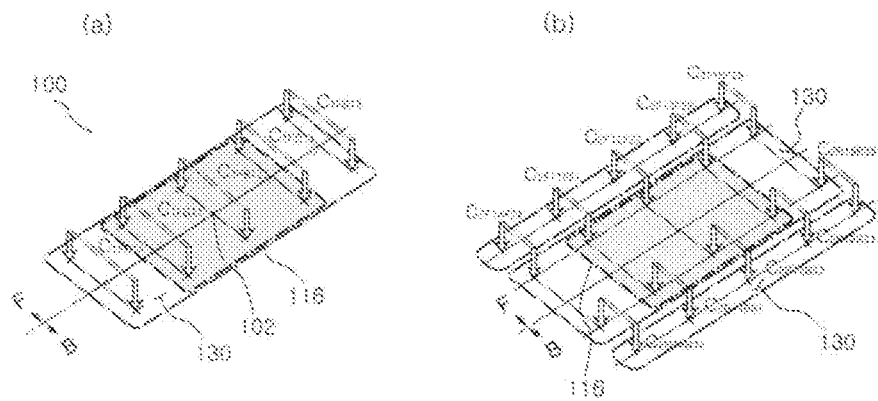

In accordance with such an input method, in the input unit 100, such as (a) to (f) of FIG. 11, (a) to (d) of FIG. 12, and (a) and (b) of FIG. 13, a data input may be performed in response to a corresponding one of the aforementioned first and second inputs.

When an input is performed on the input unit, the control unit 300 may distinguish and determine a selection or a corresponding input in input signals generated by detecting the selection or input of a user, may extract data, allocated to the determined input signal, from the memory unit 400 in which allocated input signals have been stored, and may perform the input of the data. In this case, the control unit may distinguish and determine a corresponding input in input signals generated when each of the input units is input using a setting time value set as a specific or common setting value or an input signal value stored in a database. Furthermore, the control unit may extract data allocated to an input signal generated when an input is performed on each of the input units using the input signal control methods or various control methods of the aforementioned embodiments, and may perform the input of the data. Accordingly, inputs according to the present invention are not intended to be limitative.

Embodiment 2

Figure 14:
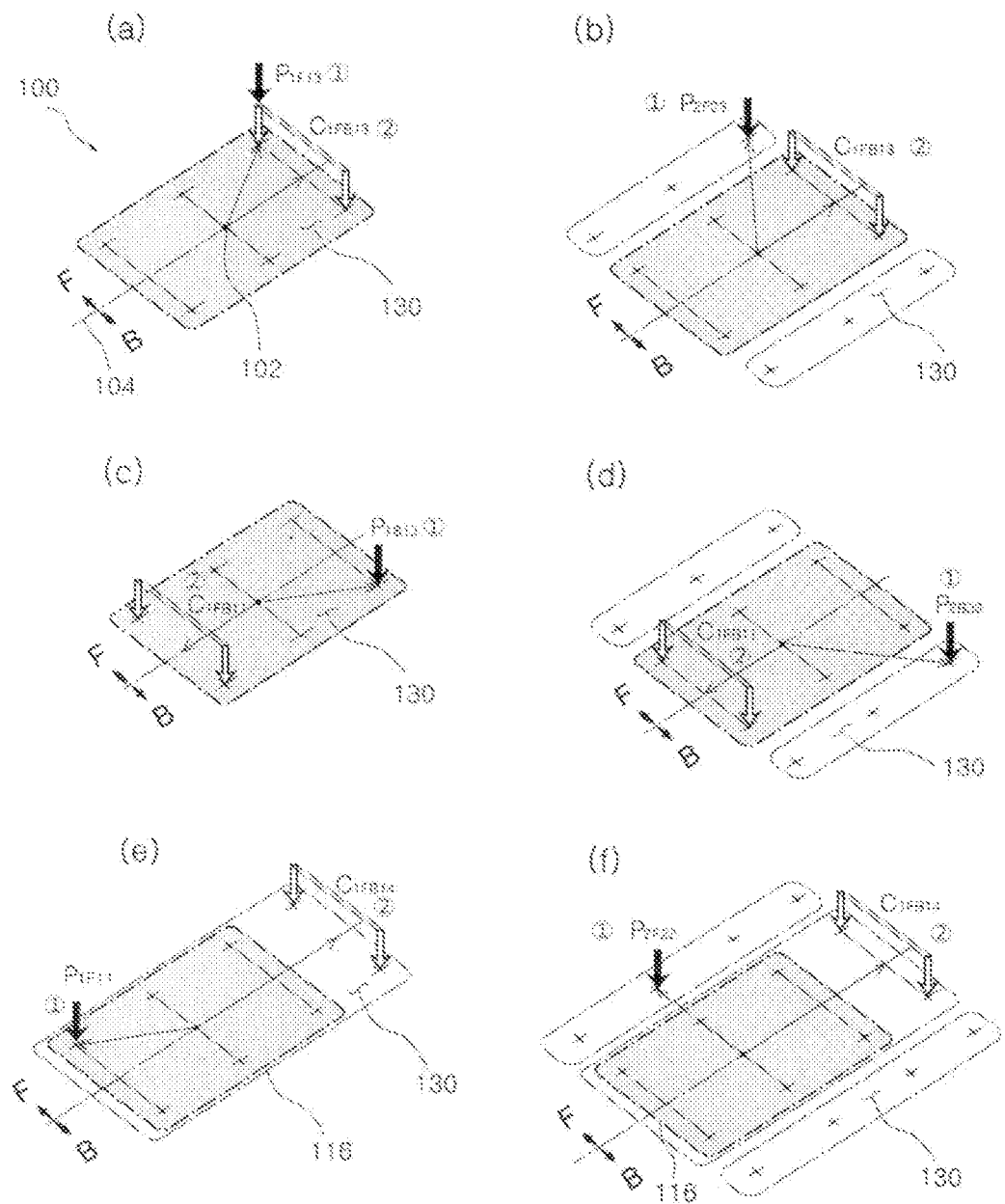
FIGS. 14 and 15 are exemplary diagrams illustrating combination inputs performed in the input unit according to the present invention.
Figure 15:
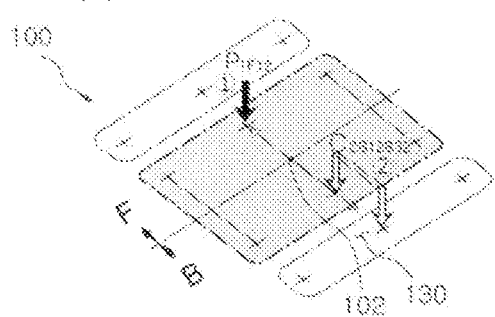
Figure 15:
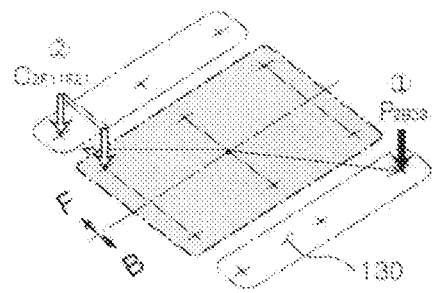
Figure 15:
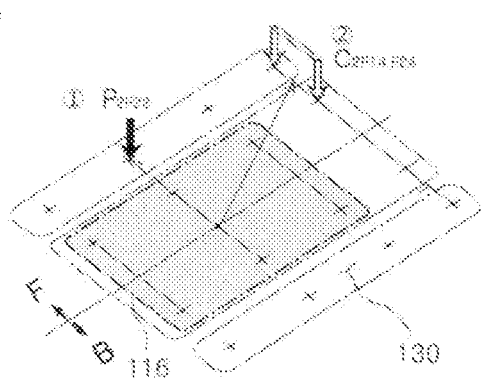

Referring to FIGS. 3, 14, and 15, in the data input apparatus 1 according to the present invention, a combination input may be further included in the aforementioned inputs to the input unit 100 according to the present invention, and then data inputs may be performed.

In other words, a combination input in which a plurality of inputs is combined is further included in the inputs to the input unit 100 according to the present invention. In this case, the combination input includes a first combination input or a second combination input. In this case, referring to (e) of FIG. 10, the first combination input is an input in which the first separate input and first pair input of the aforementioned inputs to the input unit 100 according to the present invention are sequentially performed. That is, the first combination input is performed by sequentially performing the first separate input in which one indication location 120 of the first front indication locations 121 and first back indication locations 122 of the first input unit 111 is selected in the input unit and the first pair input in which a pair of the first front indication location 121 and first back indication location 122 are selected together. Furthermore, referring to (e) of FIG. 10, the second combination input is an input in which the second separate input and first pair input of the aforementioned inputs to the input unit 100 according to the present invention are sequentially performed. That is, the second combination input is performed by sequentially performing the second separate input in which one of the indication locations 120 of the second input unit 112 is selected or one of the indication locations 120 of the third input unit 113 is selected in the input unit and the first pair input. In this case, the control unit 300 performs the input of new data different from data allocated to a corresponding indication location in the combination input.

More specifically, referring to FIG. 3 and (e) of FIG. 10, the combination input of the input unit 100 according to the present invention is performed as a first combination input P1F1-C1FB1, P1B1-C1FB1, C1FB1-P1F1 or C1FB1-P1B1 in which the first separate input P1F1 or P1B1 for independently selecting one indication location 120 of the first front indication locations 121 and first back indication locations 122 of the first input unit 111 in the input unit and the first pair input C1FB1 for selecting a pair of the first front indication location 121 and the first back indication location 122 are sequentially performed. Furthermore, the combination input of the input unit may be performed as the second combination input P2F2-C1FB1, P2B3-C1FB1, C1FB1-P2F2 or C1FB1-P2B3 in which the second separate input for selecting one second indication location 125 of the indication locations 120 of the second input unit 112 in the input unit and the first pair input are sequentially performed or in which the second separate input for selecting one third indication location 127 of the indication locations 120 of the third input unit 113 and the first pair input are sequentially performed. In this case, the control unit 300 performs the input of new data different from data allocated to a corresponding indication location in the combination input.

In the combination input, if the first separate input and the first pair input or the second separate input and the first pair input are combined in different combination order, the control unit 300 distinguishes and determines different input signals in order of the combination of the inputs, and performs the input of different data allocated to the corresponding input of each combination or performs the input of predetermined data.

Meanwhile, in the combination input of the input unit 100 according to the present invention, the control unit 300 distinguishes and determines a corresponding input signal in three signals generated by the combination of one signal and two different signals when an input is performed, and performs the input of any one of the aforementioned first combination input and second combination input.

In the combination input of the input unit, the data generated by the aforementioned sequential combination of the first separate input and the first pair input and the data generated by the sequential combination of the first pair input and the first separate input may appear identically.

Furthermore, the data generated by the aforementioned sequential combination of the first separate input and the first pair input and the data generated by the sequential combination of the first pair input and the first separate input may appear differently.

Figure 9:
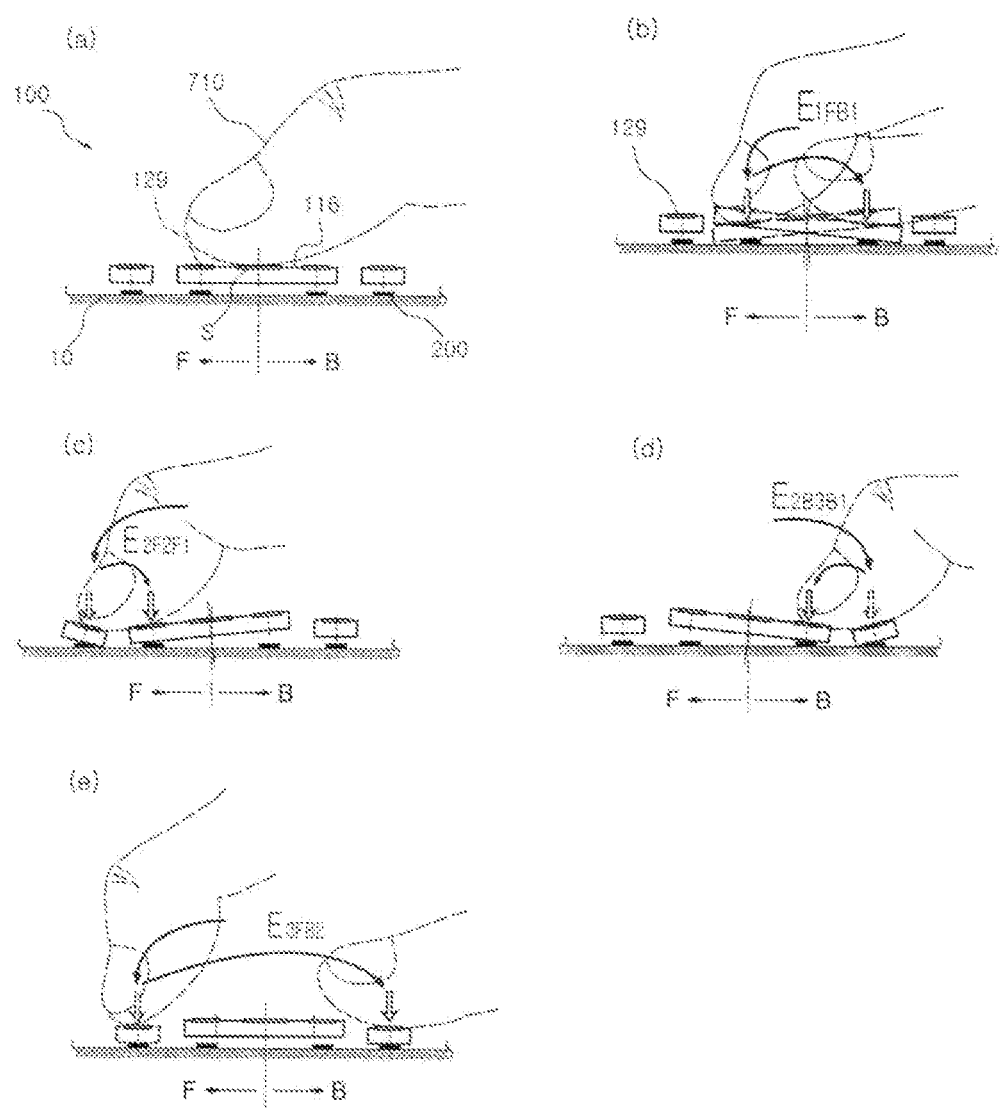
FIG. 9 is an exemplary diagram illustrating alternate inputs performed in the input unit according to the present invention and corresponding input operations.
Figure 18:
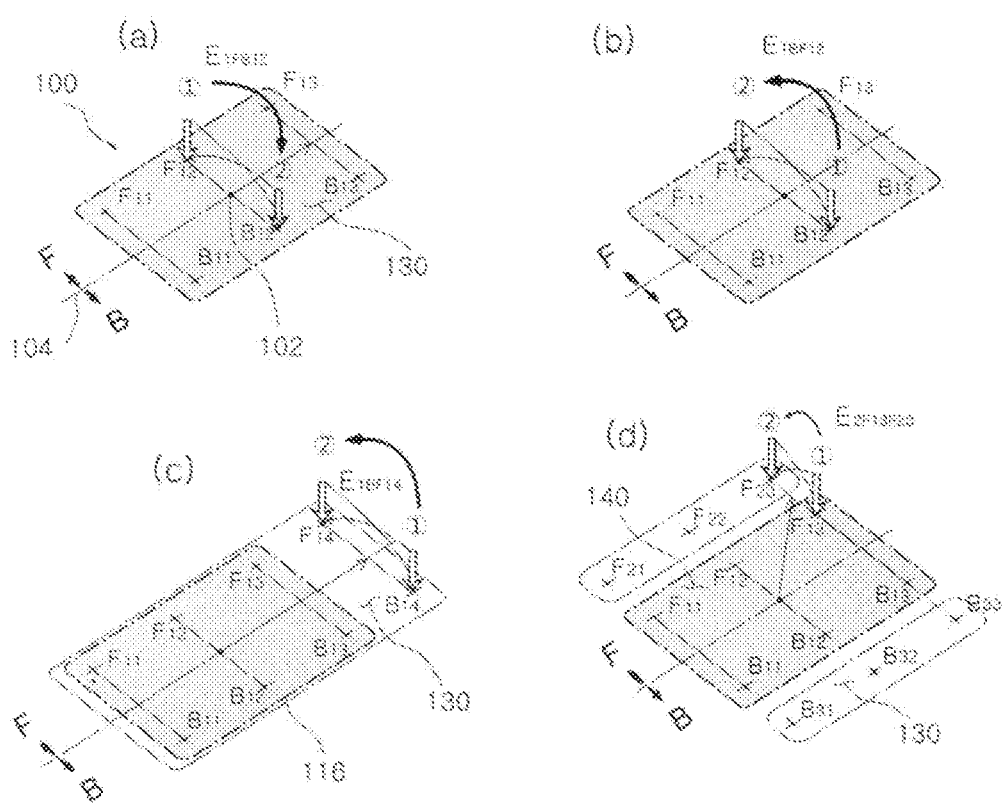
FIG. 18 is an exemplary diagram illustrating alternate inputs performed in the input unit according to the present invention.

Referring to FIGS. 3, 9 and 18, in the data input apparatus 1 according to the present invention, an alternate input may be further included in the aforementioned inputs to the input unit 100 according to the present invention, and then a data input may be performed.

For example, referring to (b) to (e) of FIG. 9 and (f) of FIG. 10, the inputs to the input unit 100 according to the present invention further include an alternate input in which different two of the indication locations 120 of the first input, unit 111 to third input unit 113 of the input unit are alternately selected.

In the data input apparatus, the control unit 300 may distinguish and determine a corresponding input in input signals generated when each input is performed on the input unit 100 using various control methods, may extract data, allocated to the determined input signal, from the memory unit 400 in which allocated input signals have been stored, and may perform the input of the allocated data. Accordingly, inputs according to the present invention are not intended to be limitative.

Embodiment 3

Figure 16:
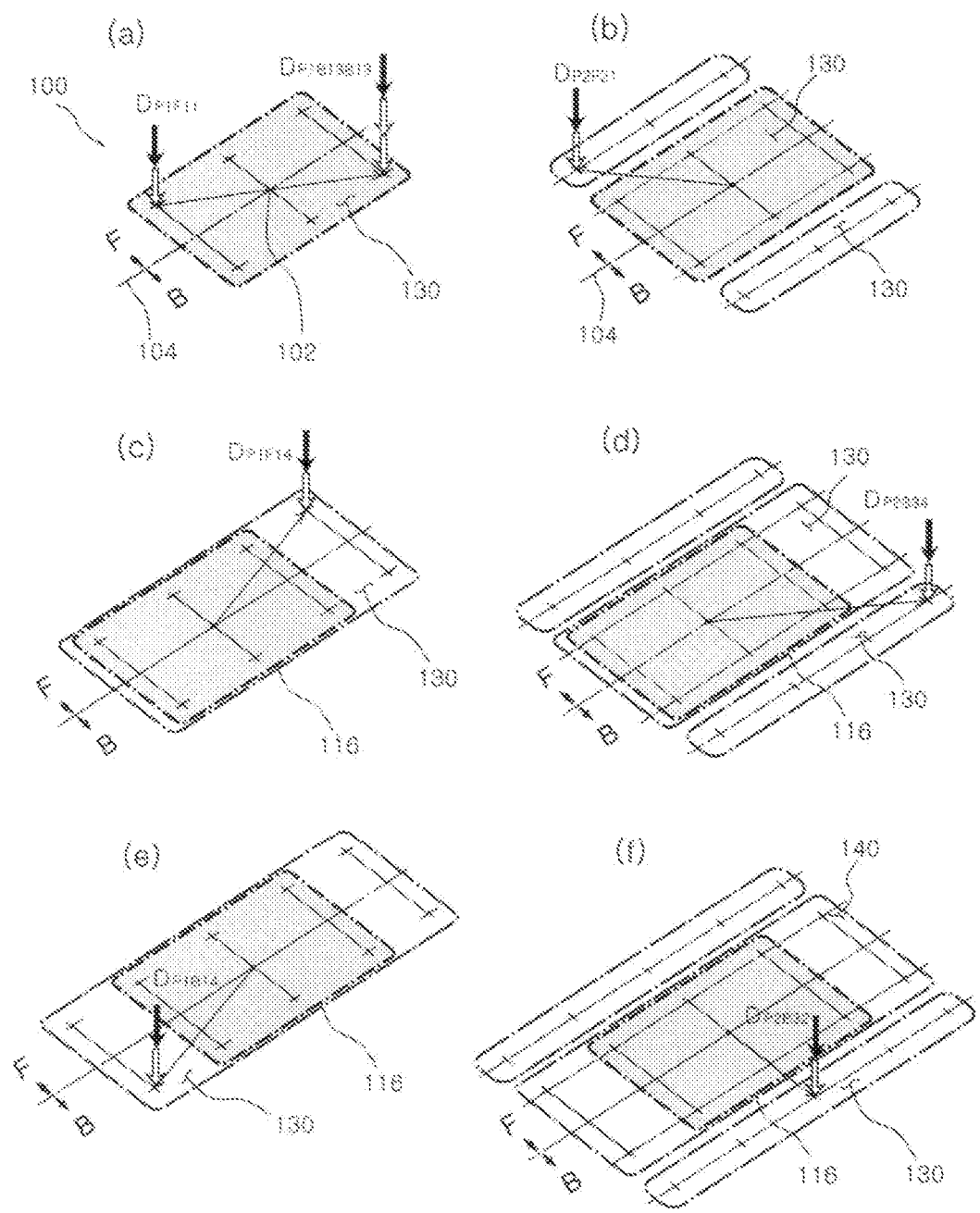
FIGS. 16 and 17 are exemplary diagrams illustrating stepwise inputs performed in the input unit according to the present invention.
Figure 17:
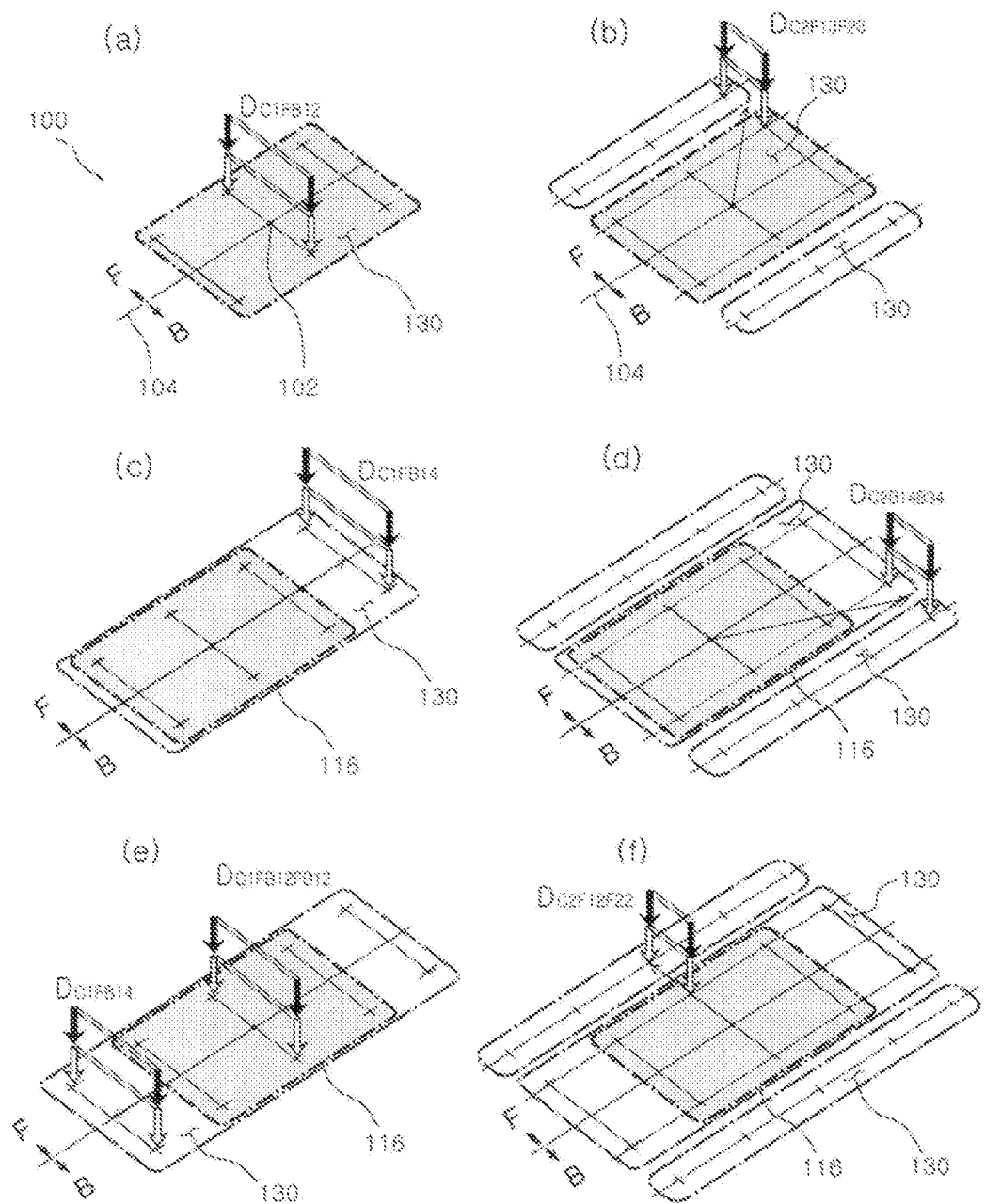

Referring to FIGS. 3, 16, and 17, in the data input apparatus 1 according to the present invention, a stepwise input may be further included in the aforementioned inputs to the input unit 100 according to the present invention, and then a data input may be performed.

In other words, the inputs to the input unit 100 according to the present invention further include a stepwise separate input in which one of the indication locations 120 of the first input unit 111 to third input unit 113 of the input unit is selected in a stepwise manner. In this case, referring to (c) of FIG. 10, the stepwise separate input is performed in such a manner that a corresponding indication location is selected in a stepwise manner depending on the difference in the intensity of pushing or the difference in the number of selections in the first separate input in which one indication location 120 of the first front indication locations 121 and first back indication locations 122 of the first input unit 111 is selected in the input unit 100 and in the second separate input in which one of the indication locations 120 of the second input unit 112 is selected or one of the indication locations 120 of the third input unit 113 is selected.

For example, in the input unit 100, such as (b) of FIG. 16, if the indication location F21 of the second input unit 112 is an input target and when the front left portion (661 in (a) of FIG. 4) of the first input unit 111 is selected twice in a stepwise manner based on the location recognition of the aforementioned indication locations 120 of the input unit 100 (in the location recognition described with reference to FIG. 4), the indication location F21 disposed at the location of the front left portion 661 is selected twice in a stepwise manner, and thus a stepwise separate input DP2F21 is performed. That is in the input unit, a stepwise input is performed as the stepwise separate input DP2F21 for the F21 indication location of the input target. That is, in the input unit, a stepwise input is performed as the stepwise separate input DP2F21 for the indication location F21 of the input target.

In the stepwise input, the control unit 300 performs the input of new data different from data allocated to a corresponding indication location.

Figure 20:
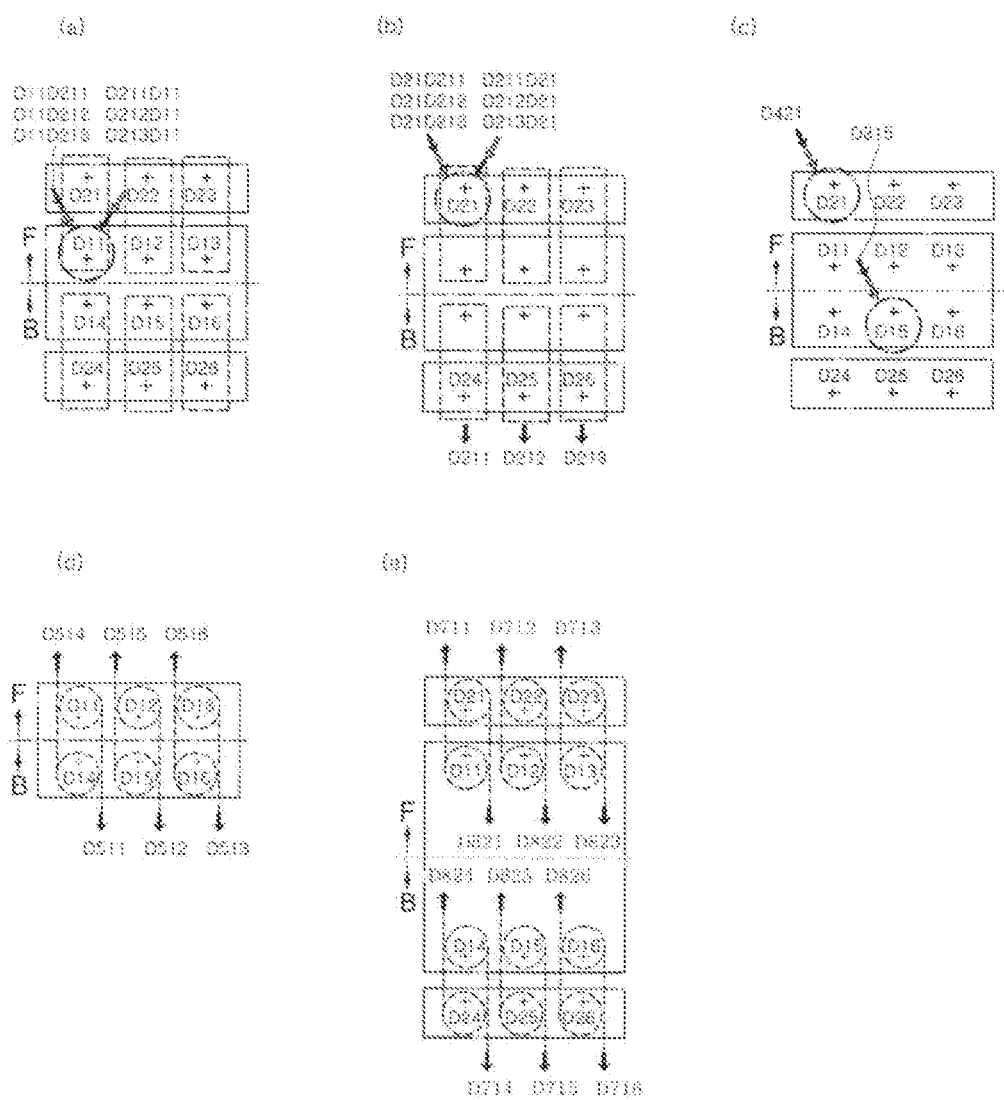

For example, referring to (b) of FIG. 16 and (c) of FIG. 20, in an input to the indication location F21 of the input target of the input unit 100, data 'D21' allocated to the corresponding indication location F21 is output by an independent selection (the second separate input; P2F21) for the F21 indication location, and new data 'D421' different from the data allocated to the corresponding indication location F21 is output by twice multi-stage selections (the stepwise separate input; DP2F21) for the F21 indication location. In such a case, referring to (c) of FIG. 20, the control unit 300 distinguishes and determines the second separate input P2F21 and, the stepwise separate input DP2F21 in the input to the input unit and performs the input of the different data 'D21' or 'D421' corresponding to the determined input.

Meanwhile, the inputs to the input unit 100 according to the present invention further include a stepwise pair input in which a plurality of indication locations 120 of the indication locations 120 of the first input unit 111 to third input unit 113 of the input unit is selected in a stepwise manner. In this case, referring to (d) of FIG. 10, the stepwise pair input is performed in such a manner that a corresponding indication location is selected in a stepwise manner depending on the difference in the intensity of pushing or the difference in the number of selections in the first pair input in which a pair of the first front indication location 121 and first back indication location 122 of the first front indication locations 121 and first back indication locations 122 of the first input unit 111 is selected in the input unit 100 or in the second pair input in which both one fast front indication location 121 of the indication locations 120 of the first input unit 111 to the third input unit 113 and one second indication location 125 spaced apart from the first front indication location and disposed at a location corresponding to the first front indication location are selected or both one first back indication location 122 of the indication locations 120 of the first input unit 111 to the third input unit 113 and one third indication location 127 spaced apart from the first back indication location and disposed at a location corresponding to the first back indication location are selected. In this case; the control unit 300 performs the input of new data different from data allocated to the corresponding indication location in the stepwise input.

For example, in the input unit 100, such as (b) of FIG. 17, if the F13 indication location of the first input unit 111 and, the F23 indication location of the second input unit 112 are input targets and when both the right front (651 in (a) of FIG. 4) of the first input unit 111 and the front right (663 in (a) of FIG. 4) of the first input unit are selected twice in a stepwise manner based on the location recognition of the aforementioned indication locations 120 of the input unit 100 (in the location recognition described with reference to FIG. 4), the indication location F13 and the indication location F23 respectively disposed at the locations of the right front portion 651 and the front right portion 663 are selected twice in a stepwise manner, and thus the stepwise pair input DC2F13F23 is performed. That is, in the input unit, a stepwise input is performed as the stepwise pair input DC2F13F23 for the F13 indication location and F23 indication location of the input targets.

Furthermore, referring to (a) of FIG. 16 and (e) of FIG. 17, a stepwise input may be performed on the indication location 120 when a corresponding one of the first input and the second input performed in the input unit 100 according to the present invention is performed depending on the difference in the intensity of pushing or the difference in the number of selections three times in a stepwise manner.

In accordance with such an input method, in the input unit 100, such as (a) to (f) of FIG. 16 and (a) to (f) of FIG. 17, a corresponding one of the aforementioned stepwise inputs may be applied to a data input, and then the data input may be performed.

Meanwhile, in the stepwise input to the input unit 100 according to the present invention, the control unit 300 distinguishes and determines a corresponding input signal in a plurality of sequential signals generated in a plurality of multiple steps when an input is performed, and performs the input of any one of the stepwise separate input and the stepwise pair input.

In this case, the control unit 300 may distinguish and determine a corresponding input signal in two sequential signals sequentially generated from the stepwise separate input or stepwise pair input of the input unit 100 and two signals sequentially generated from the first separate input, the second separate input, the first pair input, or the second pair input of the aforementioned inputs of the input unit 100 according to the present invention, and may perform any one of the inputs.

For example, in the input unit 100, such as (a) of FIG. 11 and (a) of FIG. 16, the control unit 300 may divide the first separate input and the stepwise separate input based on a predetermined setting time value, and may perform input processing on corresponding data. That is, when the indication location F11 is selected twice in the input unit while an input is performed and thus two sequential signals are generated by a sequential contact with the detection sensor of the detection unit 200, the control unit 300 determines the corresponding input to be the stepwise separate input DP1F11 if the time difference between the points of time at which the two contact signals according to, the first contact with the detection sensor and the second contact with the detection sensor for the F11 indication location are generated is within a predetermined setting time value. If the time difference exceeds the predetermined setting time value, the control unit 300 determines the corresponding input to be the twice first separate input P1F11, and performs the input of each of data allocated to the input. In this case, the setting time value may be 0.2 second, or may be determined by taking into account the difference between the points of time at which sequential contacts are made.

Furthermore, in the input unit 100 according to the present invention, when an input, such as (a) of FIG. 16 or (e) of FIG. 17, is performed, the indication location 120 in the corresponding input, may be selected three or more times in a stepwise manner depending on the difference in the intensity of pushing or the difference in the number of selections, and thus a stepwise input may be performed. In such a case, the stepwise input to the input unit may further include the aforementioned stepwise separate input and stepwise pair input, and then the corresponding input may be performed. In this case, the control unit 300 may distinguish and determine a corresponding input in input signals generated when the input is performed using various control methods may extract data, allocated to the determined input signal, from the memory unit 400 in which allocated input signals have been stored, and may perform the input of the extracted data. Accordingly, inputs according to the present invention are not intended to be limitative.

Embodiment 4

Referring to (d) to (g) of FIG. 30 and (a) and (b) of FIG. 31, the data input apparatus 1 according to the present invention may include two or more input units 100 at specific locations of the base 10. In this case, each of the indication locations 120 of the input units generates a signal in response to a selection when an input is performed.

Referring to FIGS. 3 and 11 to 18, if two input units 100 and 100' are included in the data input apparatus 1 according to the present invention, each of the two or more input units includes the first input unit 111, the second input unit 112, and the third input unit 113 each having a specific width and length. Furthermore, in the two or more input units, inputs according to an independent selection or sequential selection for one or more of the indication locations 120 of the first input unit 111 to the third input unit 113 may be detected, input signals corresponding to the inputs may be generated, and then the corresponding inputs may be performed independently or sequentially.

In each of the two or more input units, the aforementioned inputs to the input unit 100 according to the present invention are applied to corresponding data inputs, and then the corresponding data inputs are performed.

Meanwhile, in the two or more input units 100 according to the present invention, each of the input units may be provided such that a letter, a number, a symbol, a figure, a special character, a special symbol, a mode change, or each function command is performed by the selection of one or more of the indication locations 120 of the first input unit 111 to the third input unit 13.

Figure 23:
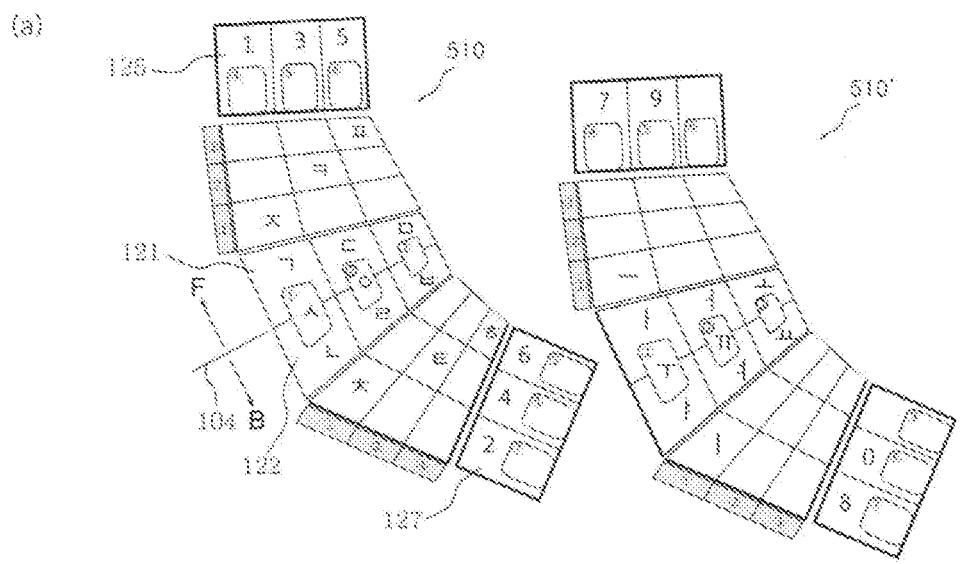
FIGS. 23, 24, and 25 are exemplary diagrams illustrating the indication locations of letters, numbers and direction indication mode or, data allocated to inputs in two input units according to an embodiment of the present invention.
Figure 23:
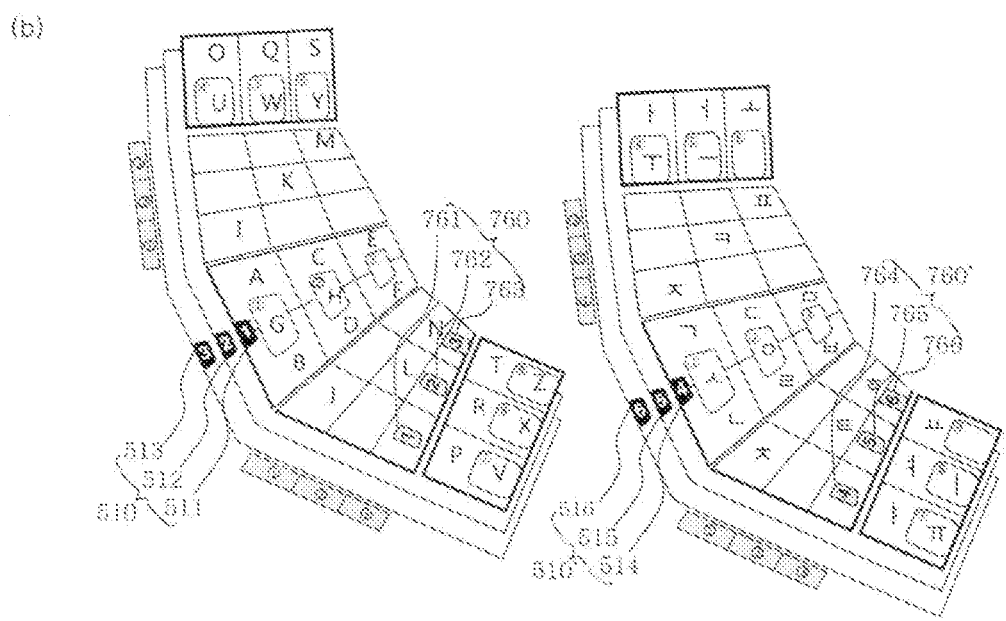
Figure 24:
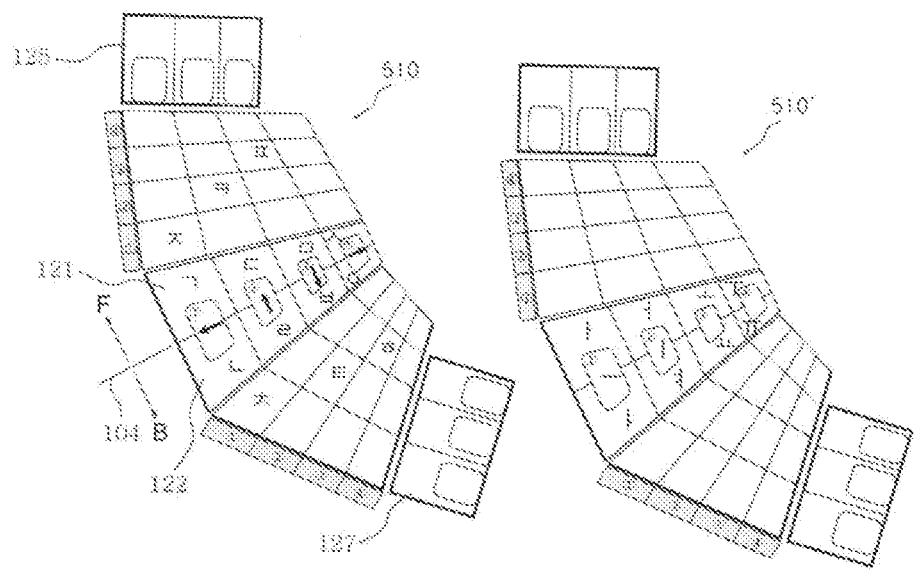
Figure 24:
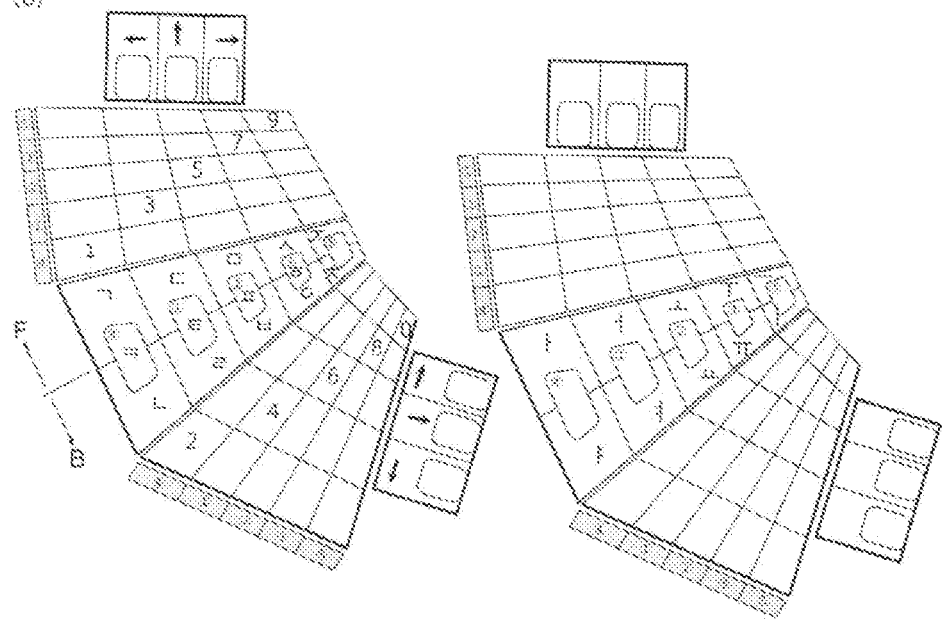
Figure 25:
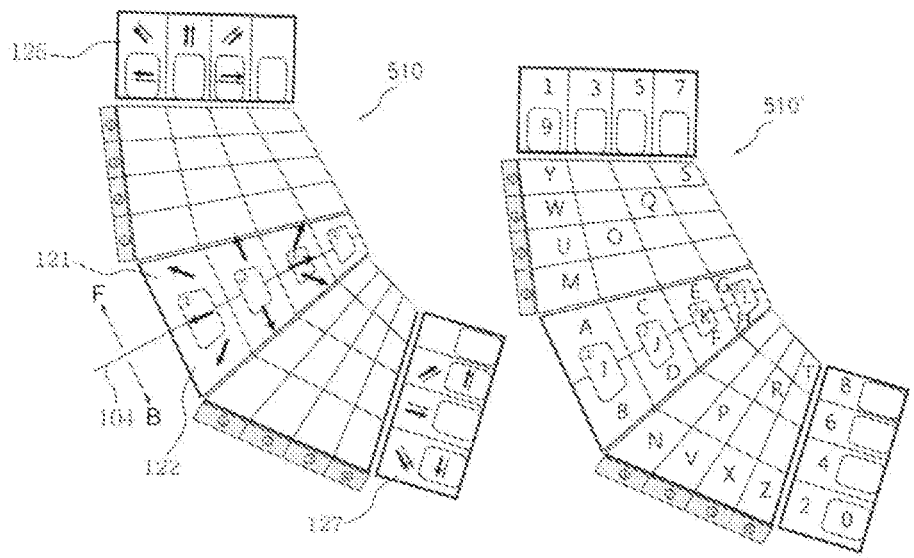
Figure 25:
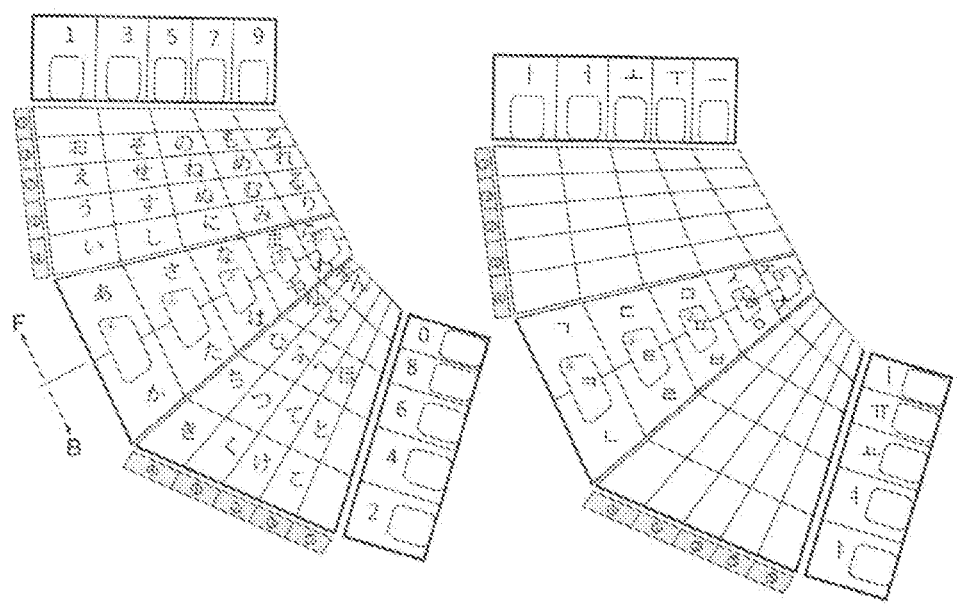

Furthermore, referring to FIGS. 23, 24, and 25, the two or more input units may be configured such that one or more of the aforementioned inputs to the input unit 100 according to the present invention are performed identically or differently. Furthermore, the two or more input units may be configured such that one or more of the aforementioned inputs to the input unit 100 according to the present invention perform the same function or different functions.

Meanwhile, as shown in (g) of FIG. 30, the data input apparatus 1 according to the present invention may include three input units 100, 100' and 100." In this case, the input units may be configured in various forms. Furthermore, referring to FIGS. 3, 4, 7 to 18, the aforementioned inputs to the input unit 100 according to the present invention may be applied to the two or more input units, and then corresponding data inputs may be performed independently or sequentially in response to a user's selection.

Embodiment 5

As shown in FIG. 2, the data input apparatus 1 according to the present invention includes the input unit 100 at a specific location of the base 10.

Figure 26:
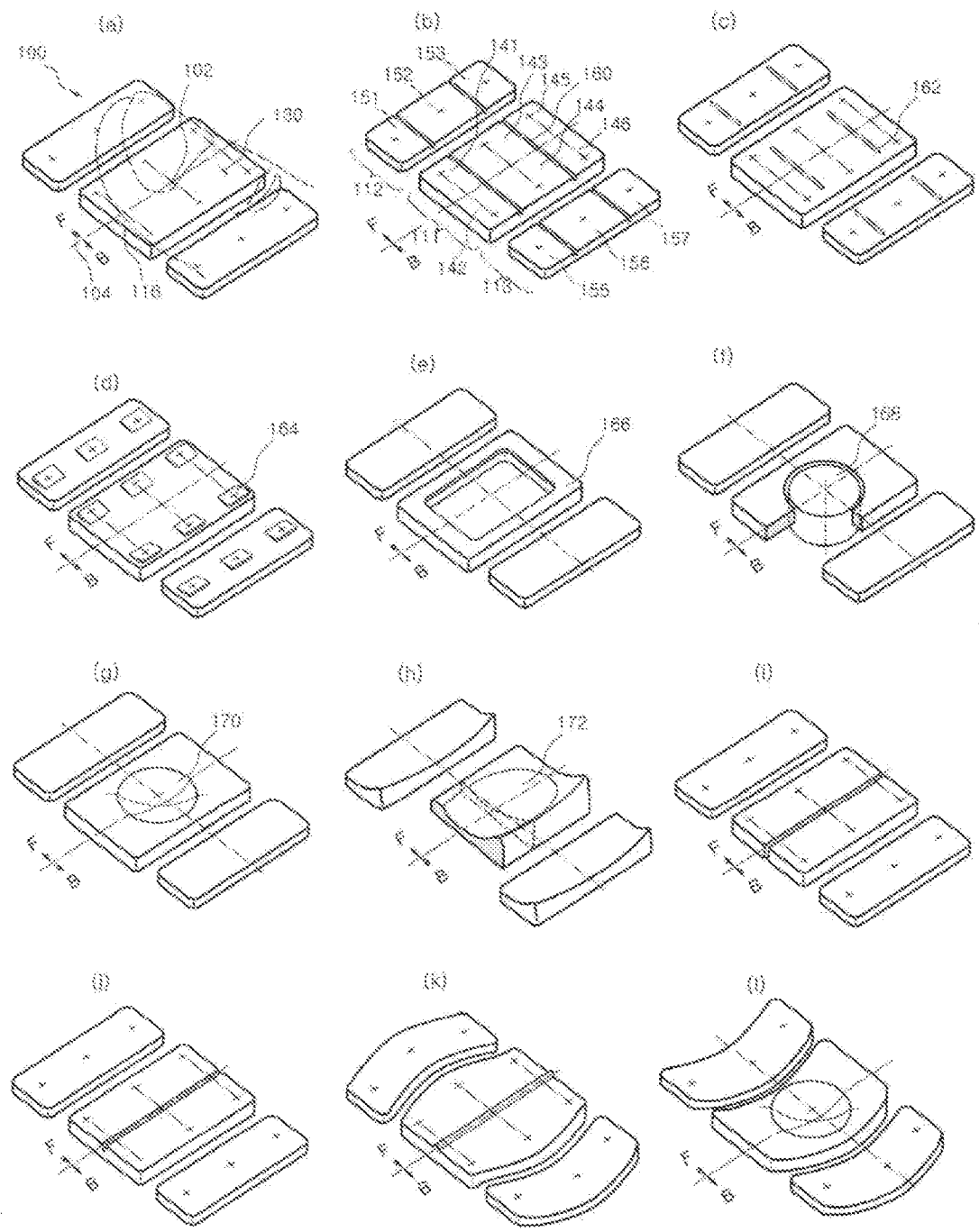
FIG. 26 is an exemplary diagram illustrating various forms of input units according to the present invention and auxiliary portions formed in the input units.

Referring to FIG. 26, the input unit 100 according to the present invention is configured in various forms including (a) to (l) of FIG. 26. That is, the input unit may be provided in a form entirely or partially including any one of a flat shape such as (a) of FIG. 26, a polygon shape, an oval shape, a semispherical shape and a circular shape, or in the form of a combination thereof. Furthermore, the input unit may be provided to include one or more of segmentation grooves 160 in concave forms such as (b) of FIG. 26, segmentation lines 162 in protrusion forms such as (c) of FIG. 26, protrusions 164 such as (d) of FIG. 26, and a protrusion frame 166 such as (e) of FIG. 26, in each of the shapes. Furthermore, the input unit may be provided in an integrated form including a concave portion 170 such as (g) of FIG. 26 or an asymmetrical concave portion 172 such as (h) of FIG. 26. Furthermore, the input unit may be provided in such a manner that a support 168 is included at the center of the input unit 100 and the support protrudes outside the input unit or inwardly concave, as shown in (f) of FIG. 26. Furthermore, as shown in (a) of FIG. 5, the input unit may include various forms of the input faces 130 formed such that the indication locations 120 placed in the first input unit 111 to the third input unit 113 are selected when an input is performed. Furthermore, the input unit may be provided in a detachable form, such as (b) of FIG. 31.

Referring to FIGS. 7, 8, and 9, the input unit 100 according to the present invention includes the detection unit 200 for detecting the selection or input of a user when an input is performed. In this case, the detection unit may be configured to include one or more of a pressure sensor, a tactile sensor, a touch pad, and a touch screen.

Figure 28:
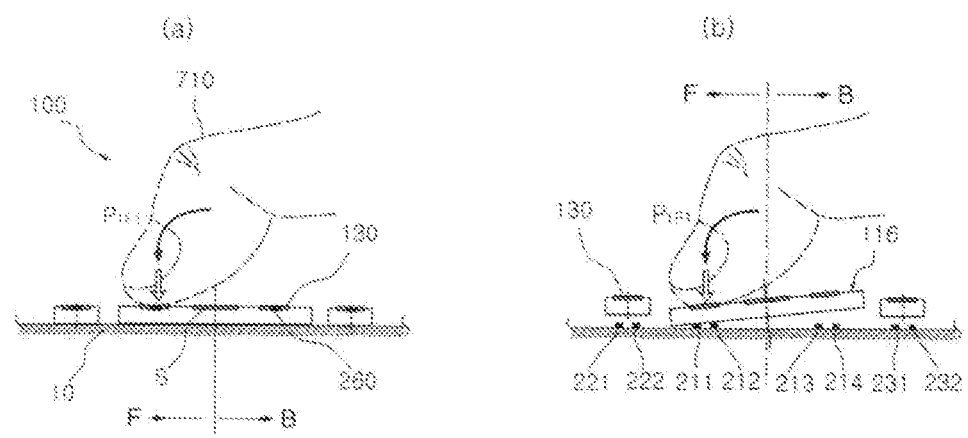
FIG. 28 is an exemplary diagram illustrating various forms of detection units provided in the input units according, to the present invention.

Furthermore, as shown in (a) of FIG. 28, a touch detection unit 260 for detecting a finger touch may be provided on the input unit 100 according to the present invention. In such a case, the touch detection unit generates a corresponding input signal in response to a finger touch on the input face 130 at a location corresponding to a corresponding one of the indication locations 120 placed at the first input unit 111 to third input unit 113 of the input unit when an input is performed.

Furthermore, referring to (b) of FIG. 28, the input unit 100 according to the present invention may include the detection unit 200 touched in accordance with each of the indication locations 120 disposed in the input unit when an input is performed. In this case, the detection unit may include a plurality of detection sensors. For example, as shown in (b) of FIG. 28, the input unit 100 may include a 211-th sensor 211 and a 212-th sensor 212 at locations corresponding to the first front indication location 121 of the first input unit 111, and may include a 213-th sensor 213 and a 214-th sensor 214 at locations corresponding to the first back indication location 122 of the first input unit. Furthermore, as shown in (b) of FIG. 28, the input unit 100 may include a 221-th sensor 221 and a 222-th sensor 212 at locations corresponding to the second indication location 125 of the second input unit 112, and may include a 231-th sensor 231 and a 232-th sensor 232 at locations corresponding to the third indication location 127 of the third input unit 113. In this case, the control unit 300 distinguishes and determines selections or inputs in input signals generated by detecting the selection or input of a user for the indication locations 120 of the input unit, may extract data, allocated to the determined input signals, from the memory unit 400 in which allocated input signals have been stored, and may perform the input of the extracted data.

Referring to FIGS. 30 and 31, one or more side keys or function keys 760 may be further included at a specific location of the base 10 including the input unit 100 according to the present invention. In this case, as shown in (a) of FIG. 28, the touch detection unit 260 for detecting a finger touch on the side key or function key 760 may be further provided. In this case, if the finger touch on the touch detection unit is detected for a specific or longer time, the control unit 300 treats a touch input signal from the detection signal of the touch detection unit 260 as being invalid.

Referring to FIGS. 30 and 31, one or more display units 500 may be provided at a specific location of the base 10 including the input unit 100 according to the present invention.

Furthermore, referring to FIGS. 21 to 25, one or more data arrangement units 510 are further included in the display unit 500. In such a case, data allocated to each of the indication locations 120 of the input unit 100 is displayed on the data arrangement unit. Furthermore, the contents of a corresponding input or data allocated to selected mode is displayed on the data arrangement units in response to a user's selection.

Furthermore, referring to (e) of FIG. 21 and (b) of FIG. 23, the data arrangement unit 510 or 510' may be output and displayed on one or more menu windows 520, or may be divided for each layer in a multi-layer mode form in which data is input to a plurality of layers and displayed (511, 512, 513, 514, 515 and 516).

Furthermore, referring to FIGS. 21 to 25, each function command allocated to each of the indication locations 120 of the input unit 100 or a corresponding input when the input to the input unit is performed may be displayed on the data arrangement unit. In such a case, each of the function commands includes a letter, a number, a symbol, a figure, a special character, a special symbol, or a direction indication.

Furthermore, the input unit 100 may further include the one or more menu windows 520 output and displayed in a multi-layer mode form (511, 512, and 513 in (e) of FIG. 21).

The display unit may be configured to display one or more of types of mode. For example, one or more of document functions, such as the movement of a document menu window, the drag of a document menu window, the movement search of a document menu window, and the enlargement or reduction of a document menu window, may be included and displayed in the one or more types of mode. Furthermore, one or more of mouse functions, such as a pointer, a cursor movement, a drag, rotation, zoom, scroll, a menu window, and a mouse left/right button, may be included and displayed in the one or more types of mode. Furthermore, one or more of joystick functions, such as the movement of a game character or avatar, a rise or fall in a designated direction in the movement of a game character or avatar, and rotation or jump in a designated location in a game character or avatar, may be included and displayed in the one or more types of mode.

Furthermore, referring to (e) of FIG. 21 and (b) of FIG. 23, multi-layer mode displayed in a plurality of layers may be further included in the one or more types of mode. In this case, a letter, a number, a symbol, a figure, a special character, a special symbol, or each function command may be included and displayed in the multi-layer mode. In such a case, as shown in (e) of FIG. 21 and (b) of FIG. 23, the function command may be allocated to one or more of the indication locations 120 of the input unit 100 as each function key 760 or 760', thereby enabling a user to facilitate data input. For example, referring to (e) of FIG. 21 and (b) of FIG. 23, the function key 760 or 760' may be configured to include a third function key 761, a second function key 762, a third function key 763, a fourth function key 764, a fifth function key 765, and a sixth function key 766.

Figure 27:
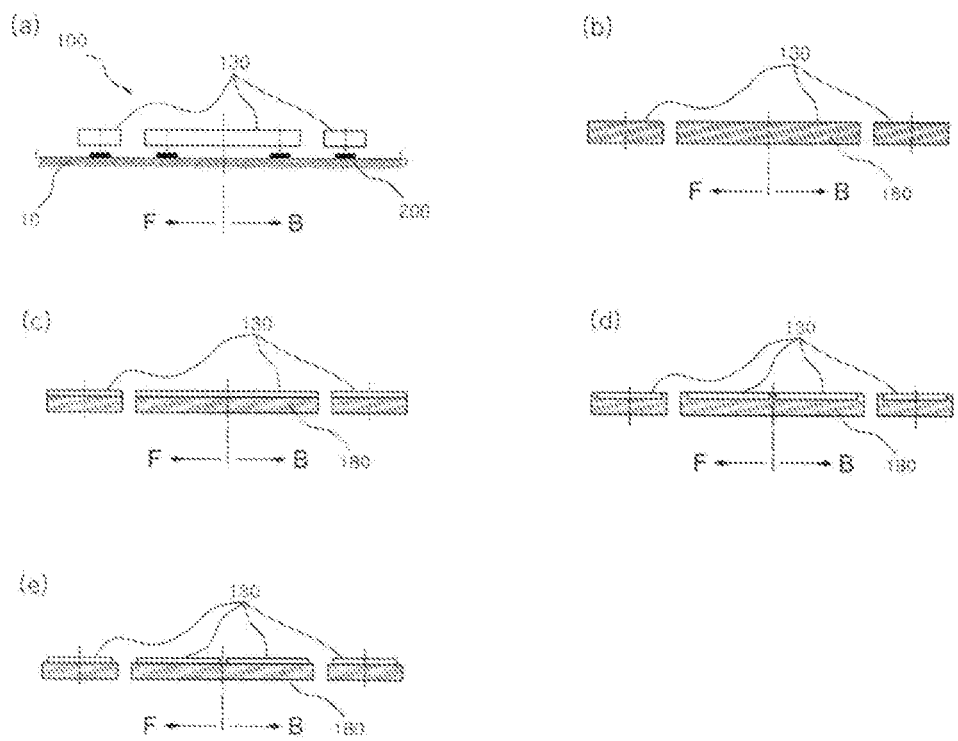
FIG. 27 is an exemplary diagram illustrating that the input units according to the present invention are provided in various forms depending on material.

As shown in FIG. 27, the input unit 100 according to the present invention may be provided in various forms, such as an elastic or non-elastic material form. That is, the input unit may be generally formed of a non-elastic member as shown in (a) of FIG. 27, or the input unit may be generally formed of an elastic member 180 as shown in (b) of FIG. 27. Furthermore, the upper side of the input unit may be formed of a non-elastic member, and the lower side of the input unit may be formed of the elastic member 180, as shown in (c) of FIG. 27. Furthermore, the input unit may be provided in such a manner that a specific part of the upper non-elastic member is segmented and received in the lower elastic member 180, as shown in (d) of FIG. 27. Furthermore, the input unit may be provided in such a manner that a specific part of the upper non-elastic member is segmented and protrudes outside the lower elastic member 180, as shown in (e) of FIG. 27.

Referring to FIG. 26, in the input unit 100 according to the present invention, as shown in (i) of FIG. 26, the first input unit 111 may be provided in such a manner that it is bisected on both sides based on the reference line 104 that passes through the reference point 102. Furthermore, as shown in (j) of FIG. 26, in the input unit 100, the first input unit 111 may be provided in such a manner that a concave groove is formed along the reference line 104. Furthermore, as shown in (k) of FIG. 26, in the input unit 100, the first input unit 111 may be provided in such a manner that a convex protrusion is formed along the reference line 104. Furthermore, the input unit 100 may be provided in a symmetrical form based on the reference point 102. Furthermore, the input unit 100 may be provided in an asymmetrical form based on the reference point 102.

Referring to FIGS. 2, 30, and 31, the data input apparatus 1 according to the present invention includes the input unit 100 at a specific location of the base 10. The input unit may be configured in various forms in a terminal including one or more of an integration type ((a), (c) and (d) of FIG. 30), a slide type ((b), (e) and (g) of FIG. 30), a table type ((f) of FIG. 30), and a detachable type ((b) of FIG. 31). Furthermore, the input unit may be configured in various forms in a stand-type interface ((a) of FIG. 31) including a cradle 912 capable of being attached and detachable form the base 10, a detachable type interface ((b) of FIG. 31) configured to be coupled to and separated from the base 10, a wired type interface ((c) of FIG. 31) connected to the base 10 in a wired way, or a wireless type interface ((d) of FIG. 31) wirelessly connected to the base 10. Furthermore, the input unit may be used as a menu window controller that manipulates the menu window 520 in the interface. In such a case, the function of the menu window controller includes the manipulation, pointing, search, enlargement, reduction, change, start, drag, stop, and movement of the menu window 520. Furthermore, the input unit may further include input recognition means that operates in response to a user's selection.

Referring to FIG. 26, at least one auxiliary portion is further formed at a location on the input unit 100 of the present invention that corresponds to each of the indication locations 120 of the first input unit 111, the second input unit 112 or the third input unit 113. In this case, the auxiliary portion includes a function of assisting the facilitation of the location recognition of a finger for each indication location 120 of the input unit. Furthermore, the auxiliary portion includes a function of selecting a finger when an input operation is performed on each indication location 120 of the input unit.

In this case, the auxiliary portion of the input unit may be provided in the form of the input face 130 of the input unit 100, as shown in (a) of FIG. 5 or (a) of FIG. 26.

Furthermore, the one or more segmentation grooves 160 in concave forms, such as (b) of FIG. 26, may be formed in the auxiliary portion of the input unit, or the one or more segmentation lines 162 in protrusion forms, such as (c) of FIG. 26, may be formed in the auxiliary portion of the input unit.

Furthermore, the auxiliary portion of the input unit may be segmented in various forms by a segmentation groove in a specific groove form, or may be segmented in various forms by the segmentation line 162 in a specific line form. In this case, referring to (b) of FIG. 26, in the input unit 100, the first input unit 111 is segmented in left auxiliary portion (141 or 142)-middle auxiliary portion (143 or 144)-right auxiliary portion (145 or 146) forms. In this case, as shown in (a) of FIG. 4, the individual auxiliary portions are recognized in left-middle-right (630-640-650) forms based on the center (SS in (b) of FIG. 5) of the fingerprint region 600 of the finger. In this case, the left auxiliary portion (141 or 142)-middle auxiliary portion (143 or 144)-right auxiliary portion (145 or 146) forms may be recognized in front-back forms based on the reference line 104. That is, the auxiliary portions in the left-middle-right forms formed in the first input unit may be recognized as first left front auxiliary portion-first left back auxiliary portion (141-142), first middle front auxiliary portion-first middle back auxiliary portion (143-144), and first right front auxiliary portion-first right back auxiliary portion (145-146) forms based on the reference line 104. Furthermore, referring to (b) of FIG. 26, in the input unit 100, the second input unit 112 is segmented in a second left auxiliary portion-second middle auxiliary portion-second right auxiliary portion (151-152-153) form. In this case, the auxiliary portions in the left-middle-right form formed in the second input unit are recognized in a front left-front middle-front right (661-662-663) form relative to the first input unit based on the first input unit 111, as shown in (a) of FIG. 4. Furthermore, referring to (b) of FIG. 26, in the input unit 100, the third input unit 113 is segmented in a third left auxiliary portion-third middle auxiliary portion-third right auxiliary portion (155-156-157) form. In this case, the auxiliary portions in the left-middle-right form formed in the third input unit are recognized in a back left-back middle-back right (671-672-673) form relative to the first input unit based on the first input unit 111, as shown in (a) of FIG. 4.

Figure 29:
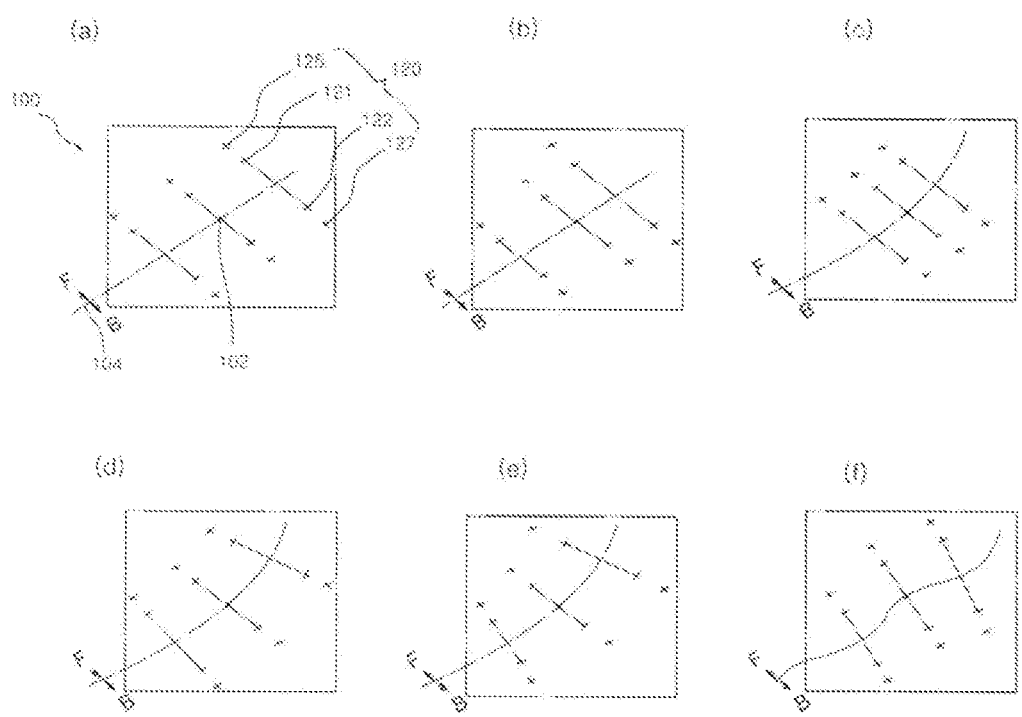
FIG. 29 is an exemplary diagram illustrating that indication locations and reference lines are provided in various forms in the input unit according to the present invention.

In this case, the segmentation groove (160 in (b) of FIG. 26) that segments the input unit may be formed in, a form, such as the reference line 104 shown in FIG. 29. In other words, the segmentation groove may be configured in one or more of a generally or partially straight line form, a generally or partially curved form and a generally or partially wave form based on the reference point 102 in the input unit. Furthermore, the segmentation groove may be configured in a generally or partially symmetrical form based on the reference point 102 in the input unit. Furthermore, the segmentation groove may be configured in a generally or partially asymmetrical form based on the reference point 102 in the input unit. Furthermore, the segmentation line (162 in (c) of FIG. 26) that segments the input unit may be formed in a form, such as the reference line 104 shown in FIG. 29. In other words, the segmentation line may be configured in one or more of a generally or partially straight line form, a generally or partially curved form, and a generally or partially wave form based on the reference point 102 in the input unit. Furthermore, the segmentation line may be configured in a generally or partially symmetrical form based on the reference point 102 in the input unit. Furthermore, the segmentation line may be configured in a generally or partially asymmetrical form based on the reference point 102 in the input unit.

Furthermore, the auxiliary portion of the input unit may be provided in the form of the one or more protrusions 164, as shown in (d) of FIG. 26. Furthermore, the auxiliary portion of the input unit may be provided in the form of the protrusion frame 166, as shown in (e) of FIG. 26.

Referring to (b) of FIG. 28, in the input unit 100 according, to the present invention, the second input unit 112 or the third input unit 113 may be equipped with one or a plurality of detection units 200 for generating a signal in response to an indication location selected when an input is performed. In this case, when an input to the input unit is performed, the control unit 300 determines a signal, generated in response to a corresponding indication location selected in the second input unit or the third input unit, to be one input signal and performs the input of data corresponding to the input signal.

Referring to FIG. 29, in the input unit 100 according to the present invention, the reference line 104 that passes through the reference point 102, i.e., a reference location, and the indication locations 102 of the input unit are configured in various forms.

For example, the reference line 104 of the input unit 100 is configured in one or more of a generally or partially straight line form, a generally or partially curved form, and a generally or partially wave form based on the reference point 102. Furthermore, as shown in FIG. 29, the reference line 104 of the input unit 100 may be configured in a generally symmetrical form or partially symmetrical form or may be configured in a generally asymmetrical form or partially asymmetrical form based on the reference point 102.

For another example, the indication locations 102 of the input unit 100 are configured in a generally or partially regular pattern or irregular pattern based on a specific reference. Furthermore, referring to (c) of FIG. 29, the indication locations 102 of the input unit 100 may be configured in various specific patterns. In such a case, referring to b to (d) of FIG. 26, the pattern may also be applied to one or more auxiliary portions formed at locations, corresponding to the indication locations 120 of the input unit. That is, the pattern may be applied to the configuration of the auxiliary portion in various forms. In this case, the reference point 102 or reference line 104 of the input unit 100 may become the specific reference. Furthermore, a specific location of the first input unit 111 to third input unit 113 of the input unit 100 may become the specific reference.

Embodiment 6

As shown in FIG. 2, the data, input apparatus 1 according to the present invention includes the input unit 100 at specific location of the base 10.

In this case, a method of inputting data using the input unit 100 provided in the base of the data input apparatus includes steps of preparing the input unit 100; storing a data set in the memory unit 400; detecting, by the detection unit 200, an input to the input unit and performing, by the control unit 300, input processing on data.

In other words, referring to FIGS. 3, 7, 8, and 32, the input in the data input apparatus 1 according to the present invention may be performed according to the following steps.

First, the step of preparing the input unit 100 is included. In this case, the input unit is configured to include the first input unit 111 having a specific width and length within a finger movement range, the second input unit 112 spaced apart from the first input unit and placed on the front sick based on the first input unit, and the third input unit 113 spaced apart from the first input unit and placed on the back side based on the first input unit. In this case, the first input unit includes the three first front indication locations 121 disposed at locations spaced apart from the single reference line 104 that passes through the reference point 102 placed at a central portion at specific intervals on the front side (in the direction of the arrow F in the drawing) and the three first back indication locations 122 disposed at locations spaced apart from the reference line at specific intervals on the back side (in the direction of the arrow B in the drawing) based on the reference line 104. Furthermore, the second input unit includes the three second indication locations 125 disposed at locations corresponding to the three first front indication locations 121, and the third input unit includes the three third indication locations 127 disposed at locations corresponding to the three first back indication locations 122.

In addition to the step, the step of storing a data set in the memory unit 400 is included. In this case, the data set is configured by dividing an input, performed in the input unit, into the first input in which one or more indication locations 120 of the first front indication locations 121 and first back indication locations 122 of the first input unit 111 are selected and the second input in which one or more of the indication locations 120 of the first input unit 111 to the third input unit 113 are selected and allocating corresponding data to each of the inputs.

In addition to the step, the step of detecting, by the detection unit 200, the input to the input unit is included. In this case, the detection unit detects the signal of the input performed as the first input or the second input in the input unit and generates a corresponding input signal.

In addition to the step, the step of performing, by the control unit 300, input processing on the data is included. In this case, the control unit distinguishes and determines the inputs in the input signals detected and generated by the detection unit when the input to the input unit is performed, extracts data, corresponding to the first input or the second input allocated to the determined input signal, from the data set of the memory unit, and performs the input of the data.

The input to the input unit 100 according to the present invention includes the finger rolling motion ((c) to (g) of FIG. 5) in which the fingerprint region 600 of a finger touches the input face 130 of the input unit and the finger is rolled and moved is included. Furthermore, the finger rolling motion may further include an operation of sliding or drawing the fingerprint region 600 of a finger in which the finger moves to the selection unit 129 corresponding to each of the indication locations 120 of the input unit. When the finger rolling motion is performed, the control unit 300 performs the input of the data of an input corresponding to an input signal of input signals that are generated in response to the slide or drawing of the finger that has moved to each of the indication locations 120 of the input unit 100.

Furthermore, when an input to the input unit 100 according to the present invention is performed, it may be performed using various types of input operations including a finger movement for pressurizing or touching the selection unit 129 corresponding to each of the indication locations 120 of the input unit. Accordingly, inputs according to the present invention are not intended to be limitative.

Although the preferred embodiments of the present invention have been described in the above detailed description of the present invention, it will be apparent to those skilled in the art that modifications and applications can be made from the above description in various ways without departing from the scope of the present invention. Therefore, the scope of the present invention should not be defined based on only the described embodiments, but should be defined based on the claims and equivalents thereto.

INDUSTRIAL APPLICABILITY

The present invention relates to a data input apparatus and method. In the data input apparatus according to the present invention, in the input unit in which a plurality of indication locations in front-back forms is provided in the base within a finger movement range based on the reference line that passes through the reference point, i.e., a reference location, a data input is performed as a first input or second input in which one indication location or a pair of indication locations is selected from the indication locations of the input unit. Furthermore, an input selection location in the input unit is recognized naturally and intuitively based on the central portion of the input unit. Furthermore, the input unit may be configured in various forms in computers, electronic devices, various terminals and mobile devices.

Accordingly, a user can easily and rapidly perform data input independently or sequentially via the intuitive interface of the input unit. That is, the data input apparatus including such an input unit is an invention having a high industrial applicability.

The invention claimed is:

1. A data input apparatus comprising:
at least one input unit which is used to allow data to be inputted and provided to a base;
a detection unit which detects an input;
a memory unit which stores data assigned to a signal of an input made in the input unit; and
a control unit which extracts the data assigned to the input from the memory unit when the input signal is made in the input unit and then allows the extracted data to be inputted,
wherein the input unit comprises:
a rectangular first input unit having a predetermined width and length included in a range of one thumb fingerprint area;
a rectangular second input unit spaced forward from the first input unit with respect to the first input unit and separated from the first input unit and having a width corresponding to the first input unit and a length smaller than the length of the first input unit; and
a rectangular third input unit spaced rearward from the first input unit with respect to the first input unit and separated from the first input unit and having a width corresponding to the first input unit and a length smaller than the length of the first input unit,
wherein the rectangular first input unit, the rectangular second input unit, and the rectangular third input unit are physically separated and independently provided from one another;
wherein the rectangular first input unit comprises:
a first input region having only three input locations arranged in a line at a predetermined interval in the forward direction on the basis of a center portion in the longitudinal direction of the rectangular first input unit; and
a second input region having only three input locations arranged in a line at a predetermined interval in the rearward direction on the basis of the center portion in the longitudinal direction of the rectangular first input unit,
wherein the rectangular second input unit comprises a third input region in which only three input locations corresponding to three input locations of the first input region are arranged in a line at predetermined intervals,
wherein the rectangular third input unit comprises a fourth input region in which only three input locations corresponding to three input locations of the second input region are arranged in a line at predetermined intervals,
wherein the input locations are vertical pressing inputs,
wherein the first input region and the third input region, and the second input region and the fourth input region are each included within a range of one thumb fingerprint area, and
wherein the control unit recognizes the input data as one data set in one input if the selection by the single input click performed by one finger is performed independently in at least one input region of the first input region to the fourth input region; or wherein the control unit recognizes and processes new data different from each data assigned to the input location of the selected input pair if the selection by the single input click performed by one finger is performed independently in at least one input pair of three input pairs consisting of three input locations of the first input region and three input locations of the second input region corresponding to three input locations of the first input region, three input pairs consisting of three input locations of the first input region and three input locations of the third input region corresponding to three input locations of the first input region and three input pairs consisting of three input locations of the second input region and three input locations of the fourth input region corresponding to three input locations of the second input region.

2. The data input apparatus of claim 1, wherein the control unit detects the simultaneous contact or the time difference contact of the above and below input regions of the input pair, recognizes it as one set data, and processes the input if the selection by the single input click performed by one finger is performed independently in at least one input pair of three input pairs consisting of three input locations of the first input region and three input locations of the second input region corresponding to three input locations of the first input region, three input pairs consisting of three input locations of the first input region and three input locations of the third input region corresponding to three input locations of the first input region and three input pairs consisting of three input locations of the second input region and three input locations of the fourth input region corresponding to three input locations of the second input region.

3. The data input apparatus of claim 1, wherein the input unit is provided in a detachable form.

4. The data input apparatus of claim 1, wherein the input unit is provided in an integrated form, including a concave portion or an asymmetrical concave portion.

5. The data input apparatus of claim 1, wherein:
the input to the input unit comprises a combination input in which a plurality of inputs is combined;
the combination input comprises a first combination input or a second combination input;
the first combination input is performed by sequentially performing a first separate input in which one of the input locations of the first input region and the second input region of the first input unit is selected and a first pair input in which a pair of the first input region and the second input region is selected;
the second combination input is performed by sequentially performing a second separate input in which one of the input locations of the second input unit is selected or one of the input locations of the third input unit is selected, and the first pair input; and
the control unit performs the input of new data different from data allocated to a corresponding input location in the combination input.

6. The data input apparatus of claim 1, wherein:
at least one auxiliary portion is further formed at a location corresponding to each of the input locations of the first input unit, the second input unit or the third input unit on the input unit; and
the auxiliary portion assists location recognition of the finger for each of the input locations of the input unit, or assists a selection of the finger when an input operation is performed on each of the input locations.

7. The data input apparatus of claim 1, wherein:
the input to the input unit comprises a stepwise separate input in which one of the input locations of the first input unit to third input unit is selected in a stepwise manner;
the stepwise separate input is performed by selecting a corresponding input location in a stepwise manner depending on a difference in an intensity of pushing or a difference in a number of selections in a first separate input in which one of the input locations of the first input region and second input unit of the first input unit is selected or in a second separate input in which one of the input locations of the second input unit is selected or one of the input locations of the third input unit is selected; and
the control unit performs an input of new data different from data allocated to a corresponding input location in the stepwise input.

8. The data input apparatus of claim 1, wherein:
the input to the input unit comprises a stepwise pair input in which a plurality of input locations of the input locations of the first input unit to the third input unit is selected in a stepwise manner;
the stepwise pair input is performed by selecting a corresponding input location in a plurality of multiple steps depending on a difference in an intensity of pushing or a difference in a number of selections in a first pair input in which a pair of three input pairs formed above and below the first input region and the second input region of the first input unit are selected together, or in a second pair input in which a pair of three input pairs formed above and below the first input region and the third input region are selected or in which a pair of three input pairs formed above and below the second input region and the fourth input region are selected; and
the control unit performs an input of new data different from data allocated to the corresponding input location in the stepwise input.

9. The data input apparatus of claim 1, wherein the input unit comprises one or more of a concave segmentation groove, a protruding segmentation line, a protrusion, and a protrusion frame in each of the shapes.

10. The data input apparatus of claim 1, wherein:
a touch detection unit for detecting a touch of the finger is further provided on the input unit; and
the touch detection unit generates a corresponding input signal in response to a touch of the finger on each of the input locations of the input unit.

11. The data input apparatus of claim 1, wherein a support is included at a center of the input unit, and the support is provided in a form in which the support protrudes outside the input unit or a form in which the support is inwardly concave.

12. The data input apparatus of claim 1, wherein the first input unit of the input unit is provided in one or more of a form in which the first input unit is bisected on both sides based on the reference line, a form in which a concave groove is formed along the reference line, and a form in which a convex protrusion is formed along the reference line.

13. The data input apparatus of claim 1, wherein two or more input units are provided at specific locations of the base.

14. The data input apparatus of claim 1, wherein:
one or more input locations for generating an input signal in response to a selection when an input is performed are further provided on a left or right side of the input unit; and
the input unit further comprises a pair of input locations on a left or right side of the first input unit, an input location on a left or right side of the second input unit, and an input location on a left or right side of the third input unit.

15. A method of inputting data using an input unit provided in a base of a data input apparatus, the method comprising:
preparing the input unit,
wherein the input unit comprises:
a rectangular first input unit having a predetermined width and length included in a range of one thumb fingerprint area;
a rectangular second input unit spaced forward from the first input unit with respect to the first input unit and separated from the first input unit and having a width corresponding to the first input unit and a length smaller than the length of the first input unit; and
a rectangular third input unit spaced rearward from the first input unit with respect to the first input unit and separated from the first input unit and having a width corresponding to the first input unit and a length smaller than the length of the first input unit, wherein the rectangular first input unit, the rectangular second input unit, and the rectangular third input unit are physically separated and independently provided from one another, wherein the rectangular first input unit comprises:
- a first input region having only three input locations arranged in a line at a predetermined interval in the forward direction on the basis of a center portion in the longitudinal direction of the rectangular first input unit; and
- a second input region having only three input locations arranged in a line at a predetermined interval in the rearward direction on the basis of the center portion in the longitudinal direction of the rectangular first input unit, wherein the rectangular second input unit comprises a third input region in which only three input locations corresponding to three input locations of the first input region are arranged in a line at predetermined intervals, and wherein the rectangular third input unit comprises a fourth input region in which only three input locations corresponding to three input locations of the second input region are arranged in a line at predetermined intervals;

storing a data set in a memory unit,
- wherein the data set is configured by dividing an input, which is performed in the input unit, into a first input in which one or more input location of the first input region and second input region of the first input unit are selected, and a second input in which one or more input location of the input locations of the first input unit to the third input unit are selected, and allocating corresponding data to each of the inputs;

detecting, by a detection unit, the input to the input unit,
- wherein the detection unit detects a signal of the input performed as the first input or the second input in the input unit and generates a corresponding input signal, wherein the first input is recognized the input data as one data set in one input if the selection by the single input click performed by one finger is performed independently in at least one input region of the first input region to the fourth input region, wherein the second input is recognized new data different from each data assigned to the input location of the selected input pair if the selection by the single input click performed by one finger is performed independently in at least one input pair of three input pairs consisting of three input locations of the first input region and three input locations of the second input region corresponding to three input locations of the first input region, three input pairs consisting of three input locations of the first input region and three input locations of the third input region corresponding to three input locations of the first input region and three input pairs consisting of three input locations of the second input region and three input locations of the fourth input region corresponding to three input locations of the second input region,
- wherein each of the single input clicks is made in a downward direction or touch,
- wherein two input signals of the second input generated by selection of each of the input pairs consist of is processed as one pair input, and
- wherein when input locations selected together to make the pair input fail to come into contact with a predetermined sensor simultaneously, two signals corresponding to the input locations are sequentially generated and a control unit determines the two signals as the pair input, based on a preset time value; and performing, by the control unit, an input of the data, wherein the control unit distinguishes and determines the inputs in the input signals detected and generated by the detection unit when the input to the input unit is performed, extracts data, corresponding to the first input or the second input allocated to the determined input signal, from the data set of the memory unit, and performs the input of the data.

* * * * *